United States Patent
Hahn et al.

(10) Patent No.: US 10,117,274 B2
(45) Date of Patent: Oct. 30, 2018

(54) METHOD FOR PERFORMING OPERATION RELATED TO RADIO LINK FAILURE IN WIRELESS COMMUNICATION SYSTEM AND APPARATUS FOR SUPPORTING THE SAME

(71) Applicant: LG ELECTRONICS INC., Seoul (KR)

(72) Inventors: Genebeck Hahn, Seoul (KR); Jiwon Kang, Seoul (KR); Heejeong Cho, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 15/452,668

(22) Filed: Mar. 7, 2017

(65) Prior Publication Data

US 2017/0265243 A1   Sep. 14, 2017

Related U.S. Application Data

(60) Provisional application No. 62/306,076, filed on Mar. 10, 2016.

(51) Int. Cl.
*H04W 74/08* (2009.01)
*H04W 76/19* (2018.01)
*H04W 76/18* (2018.01)
*H04W 76/38* (2018.01)

(52) U.S. Cl.
CPC ....... *H04W 74/0833* (2013.01); *H04W 76/18* (2018.02); *H04W 76/19* (2018.02); *H04W 76/38* (2018.02)

(58) Field of Classification Search
CPC . H04W 74/0833; H04W 76/38; H04W 76/19; H04W 76/18
See application file for complete search history.

(56) References Cited

U.S. PATENT DOCUMENTS

| | | | | |
|---|---|---|---|---|
| 9,380,605 | B1* | 6/2016 | Lee | H04W 74/0833 |
| 9,717,071 | B2* | 7/2017 | Chen | H04W 72/04 |
| 2013/0286958 | A1* | 10/2013 | Liang | H04W 74/0866 370/329 |

(Continued)

*Primary Examiner* — Jay P Patel
(74) *Attorney, Agent, or Firm* — Lee, Hong, Degerman, Kang & Waimey

(57) ABSTRACT

The present disclosure provides a method and apparatus for performing an operation related to a Radio Link Failure (RLF) in a wireless communication system. Particularly, the method performed by a user equipment (UE) includes monitoring a radio link state of a serving base station (BS); detecting a physical layer problem; transmitting a specific random access preamble related to the RLF to one or more neighboring BSs through a specific Physical Random Access Channel (PRACH) resource; receiving a random access response from the one or more neighboring BSs; determining a neighboring BS to which an additional RRC connection is to be configured based on the received random access response; and configuring an RRC connection with the determined neighboring BS, wherein the specific PRACH resource is a common PRACH resource that is separately configured to transmit the specific random access preamble, thereby preventing the Link Outage phenomenon of the UE for a specific service.

14 Claims, 14 Drawing Sheets

(56) References Cited

U.S. PATENT DOCUMENTS

| | | | | |
|---|---|---|---|---|
| 2014/0098660 A1* | 4/2014 | Viorel | ............... | H04W 28/0205 |
| | | | | 370/229 |
| 2014/0334389 A1* | 11/2014 | Abdel-Samad | ....... | H04W 76/06 |
| | | | | 370/329 |
| 2015/0092552 A1* | 4/2015 | Bajj | ...................... | H04W 28/08 |
| | | | | 370/235 |
| 2015/0358860 A1* | 12/2015 | Lu | ......................... | H04W 36/08 |
| | | | | 370/331 |
| 2016/0150570 A1* | 5/2016 | Wang | ................ | H04W 74/0833 |
| | | | | 370/329 |
| 2017/0245223 A1* | 8/2017 | Nan | .................... | H04W 52/362 |
| 2017/0325201 A1* | 11/2017 | Chen | ....................... | H04L 5/003 |
| 2017/0359839 A1* | 12/2017 | Wang | ................ | H04W 74/0833 |

* cited by examiner

METHOD FOR PERFORMING OPERATION RELATED TO RADIO LINK FAILURE IN WIRELESS COMMUNICATION SYSTEM AND APPARATUS FOR SUPPORTING THE SAME

CROSS-REFERENCE TO RELATED APPLICATIONS

Pursuant to 35 U.S.C. § 119(e), this application claims the benefit of U.S. Provisional Application No. 62/306,076 filed on Mar. 10, 2016, the content of which is hereby incorporated by reference herein in its entirety.

BACKGROUND OF THE INVENTION

Field of the Invention

The present invention relates to a method for performing an operation related to a Radio Link Failure (RLF) in wireless communication systems, and more particularly, to a method for performing an operation related to the Radio Link Failure for a specific service of low latency/high reliability and an apparatus for supporting the same.

Discussion of the Related Art

Recently, the importance of the 5G mobile communication technology has been increased more and more. And one of the actualized fields is a Reliable Communication.

The Reliable Communication means a new communication service that is realized through the Error Free Transmission or Service Availability for the realization of a Mission Critical Service (MCS).

The necessity of the Reliable Communication has been recognized since it is a part of Machine-Type Communication that satisfies Real-Time requirements for the Traffic Safety, the Traffic Efficiency, the E-Health, the Efficient Industrial Communication, and so on.

In addition, a Reliable Connection should be provided to the Reliable Communication for the applications of delay-sensitive such as the Traffic Safety or the Mission Critical Machine-Type Communications (MTCs) of a special purpose.

Furthermore, the necessity of the Reliable Communication has been also recognized for the purpose of a Medical/Emergency Response, a Remote Control, a Sensing, and the like.

It is anticipated that significant increases are required in the End-to-End Latency, the Ubiquity, the Security, the Availability/Reliability, and the like for the MCSs in comparison with the conventional UMTS/LTE and LTE-A/Wi-Fi.

That is, the commercialized wireless technologies (including 3GPP LTE and LTE-A) proposed up to now fail to guarantee the adequate performance for providing various MCSs in the aspect of the Real-Time requirements and the Reliability requirements.

In addition, as the scenarios that are applicable to the 5G mobile communication environment for the MCSs, the following services may be exemplified.

Control a robot arm remotely in order to realize the Industrial Automation, or transport heavy and large goods through the remote control for Automated Guided Vehicles (AGVs)

Remotely control a drone in order to provide the physical distribution, the remote healthcare service, and other various public services Safely exchange the information required between vehicles in order to provide an autonomous vehicle service or safely deliver the safety signal that notifies a hidden vehicle that is not detected by a vehicle sensor (e.g., camera, radar, etc.) or a forward collision In the case that the radio link (serving link) quality of a serving base station is degraded to an extent of not proper for MCSs although another available alternative base station link is determined, the above-mentioned services should be provided continuously.

Accordingly, in the case that the degradation of the radio link quality of a serving base station is detected and it is determined that the radio link quality of the serving base station is not proper for providing MCSs, a method is required for activating another multilink quickly and for configuring an MCS bearer through the activated multilink.

Owing to the reasons, in order for the Reliable Communication of 5G to be available, a terminal utilizes all radio links around and gives instruction so as to maximize the radio link according to situations, and therefore, the decrease of radio link outage for providing MCS should be considered as an essential element.

In order to fulfill these requirements, when the quality of radio link of the serving base station is degraded, a terminal may determine an optimal alternative base station among the alternative base stations which are already secured, and configure a bearer quickly through an RRC connection activation to the corresponding alternative base station and the radio link of the corresponding alternative base station.

However, the current LTE/LTE-A system is designed to process the recovery from the Radio Link Failure (RLF) very conservatively.

Owing to this, it may be difficult to search other alternative available base stations quickly according to the channel situation of UE, and to secure alternative available base station for the activation of connection to the corresponding alternative base stations.

That is, during the link switching procedure of a terminal from the radio link of a serving base station to the radio link of an alternative base station, the RLF may occur since the reception signal strength from the serving base station (or serving cell) is not maintained adequately until the successful completion of the wireless access to the radio link of the alternative base station.

Accordingly, the RLF avoiding method is required for minimizing the continuity damage in providing a specific service (e.g., MCS) that satisfies the requirements of 5G through the alternative base stations which are already secured.

SUMMARY OF THE INVENTION

An object of the present disclosure is to provide a method for avoiding the RLF through the spare RRC connection configuration to a neighboring base station(s) in order to prevent the link outage of the terminals to which the multiple connections (or multilink) are not configured.

Particularly, the present disclosure is to newly define the random access preamble and/or the PRACH resource for avoiding the RLF, and to provide a method for performing an additional configuration of the RRC connection with a neighboring base station using it.

In addition, another object of the present disclosure is to provide a method for releasing the configuration of the RRC connection that is additionally configured when the radio link quality of the serving base station is recovered.

The technical objects to attain in the present invention are not limited to the above-described technical objects and other technical objects which are not described herein will become apparent to those skilled in the art from the following description.

According to an aspect of the present disclosure, a method for an operation related to a Radio Link Failure (RLF) in a wireless communication system performed by a user equipment (UE) includes monitoring a radio link state of a serving base station (BS); detecting a physical layer problem; transmitting a specific random access preamble related to the RLF to one or more neighboring BSs through a specific Physical Random Access Channel (PRACH) resource; receiving a random access response from the one or more neighboring BSs; determining a neighboring BS to which an additional RRC connection is to be configured based on the received random access response; and configuring an RRC connection with the determined neighboring BS, wherein the specific PRACH resource is a common PRACH resource that is separately configured to transmit the specific random access preamble.

In addition, the present disclosure further includes driving a first timer related to the Radio Link Failure, wherein the specific random access preamble is transmitted in a predetermined section, and wherein the predetermined section corresponds to a time from a driving time of the first timer to the time when the first timer is terminated.

In addition, in the present disclosure, the specific random access preamble is a preamble used for notifying that an additional RRC connection configuration is required in preparation for the Radio Link Failure.

In addition, in the present disclosure, the information related to the specific random access preamble and/or information related to the specific PRACH resource are/is included in system information.

In addition, the present disclosure further includes checking whether the physical layer problem is solved until the first timer is terminated.

In addition, as a result of the checking, when the physical layer problem is solved, the present disclosure further includes transmitting an RRC connection release request message for requesting to release the RRC connection configured to the determined neighboring BS.

In addition, in the present disclosure, the random access response includes at least one of a cell ID of the neighboring BS, Load Status information representing a load state of the neighboring BS or identification information of the resource in which the specific random access preamble is detected.

In addition, in the present disclosure, detecting the physical layer problem further includes checking whether consecutive out-of-sync. Indications are received as many as a preconfigured number in the physical layer.

In addition, in the present disclosure, checking whether the physical layer problem is solved further includes checking whether consecutive out-of-sync. Indications are received as many as a preconfigured number in the physical layer.

In addition, in the present disclosure, the serving BS and the one or more neighboring BSs use an identical frequency band.

In addition, in the present disclosure, configuring the RRC connection with the determined neighboring BS includes: transmitting an RRC connection request message to the determined neighboring BS; receiving an RRC connection setup message from the determined neighboring BS; and transmitting an RRC connection setup complete message to the determined neighboring BS.

In addition, in the present disclosure, the RRC connection request message includes at least one of cause information representing that the RRC connection request is intended to avoid a potential RLF, a cell ID of the serving BS and information related to the first timer.

In addition, in the present disclosure, the RRC connection release request message includes cause information representing that the request of RRC connection release is owing to a recovery of the potential RLF.

In addition, according to another aspect of the present disclosure, a user equipment (UE) for performing an operation related to a Radio Link Failure (RLF) in a wireless communication system includes a radio frequency (RF) unit for transmitting and receiving a radio signal; and a processor functionally connected to the RF unit, wherein the processor is configured to perform: monitoring a radio link state of a serving base station (BS); detecting a physical layer problem; transmitting a specific random access preamble related to the RLF to one or more neighboring BSs through a specific Physical Random Access Channel (PRACH) resource; receiving a random access response from the one or more neighboring BSs; determining a neighboring BS to which an additional RRC connection is to be configured based on the received random access response; and configuring an RRC connection with the determined neighboring BS, wherein the specific PRACH resource is a common PRACH resource that is separately configured to transmit the specific random access preamble.

DETAILED DESCRIPTION OF THE INVENTION

Figure 1:
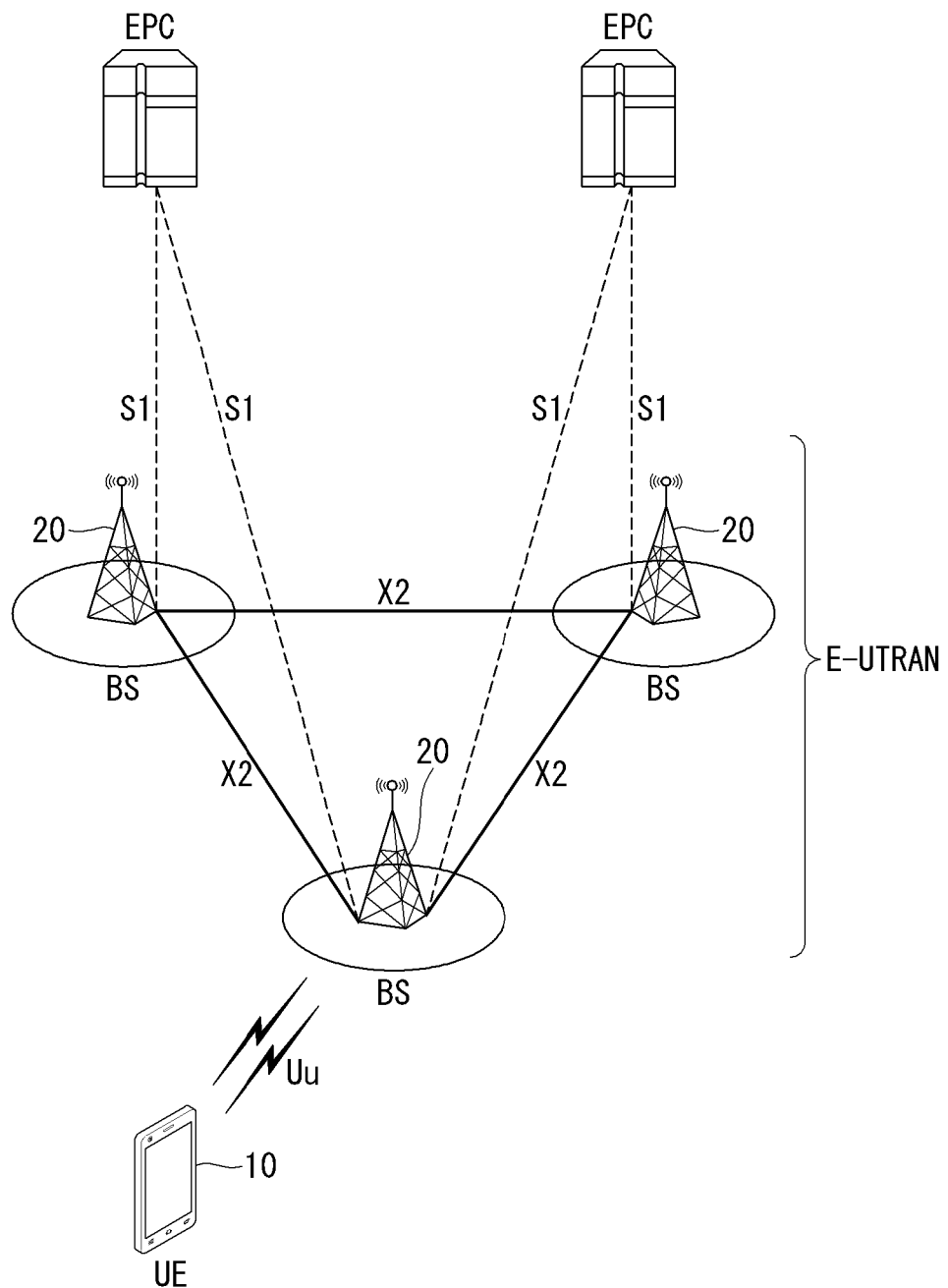
FIG. 1 is a diagram illustrating a wireless communication system to which the present invention is applied.

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

In the embodiments of the present disclosure, a base station may be a terminal node of a network, which directly communicates with a terminal. In this document, a specific operation described as performed by the base station may be performed by an upper node of the base station. Namely, it is apparent that, in a network having a plurality of network nodes including a base station, various operations performed for communication with a terminal may be performed by the base station, or network nodes other than the base station. The term 'base station (BS)' may be replaced with the term 'fixed station', 'Node B', 'evolved-NodeB (eNB)', 'base transceiver system (BTS)', 'access point (AP)', 'Macro eNB (MeNB)', 'Secondary eNB (SeNB)' etc. And, the 'terminal' may be fixed or mobile, and may be replaced with the term 'user equipment (UE)', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', etc.

Hereinafter, a downlink (DL) refers to communication from the BS to the UE, and an uplink (UL) refers to communication from the UE to the BS. In the downlink, a transmitter may be a part of the BS, and a receiver may be a part of the UE. In the UL, the transmitter may be a part of the UE, and the receiver may be a part of the BS.

Specific terms used in the description below are provided to aid the understanding of the present invention. These specific terms may be replaced with other terms within the scope and spirit of the present invention.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. The CDMA may be implemented as a radio technology such as Universal Terrestrial Radio Access (UTRA) or CDMA2000. The TDMA may be implemented as a radio technology such as Global System for Mobile communications (GSM)/General Packet Radio Service (GPRS)/Enhanced Data Rates for GSM Evolution (EDGE). The OFDMA may be implemented as a radio technology such as IEEE 802.11 (Wi-Fi), IEEE 802.16 (WiMAX), IEEE 802-20, Evolved-UTRA (E-UTRA) etc. The UTRA is a part of Universal Mobile Telecommunication System (UMTS). The $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. The LTE-advance (LTE-A) is an evolution of the 3GPP LTE.

Hereinafter, for better understanding, the terms used herein are briefly defined.

EPS: an abbreviation of an Evolved Packet System. It refers to a core network that supports the Long Term Evolution (LTE) network and to a network evolved from the UMTS.

PDN (Public Data Network): an independent network where a server is placed and provides services.

Access Point Name (APN): the name of an access point that is managed in a network and provided to a UE. That is, an APN is a character string of the PDN. Based on the name of the access point, the corresponding PDN for transmitting and receiving data is determined.

Tunnel Endpoint Identifier (TEID): The end point ID of a tunnel set between nodes within a network, and it is set for each bearer unit of each UE for each section.

MME: an abbreviation of a Mobility Management Entity. It functions to control each entity within an EPS in order to provide the session and mobility for a UE.

Session: a passage for a data transmission. A unit thereof may be a PDN, a bearer, or an IP flow unit.

The units may be classified into a unit of the entire target network (i.e., an APN or PDN unit) as defined in 3GPP, a unit (i.e., a bearer unit) classified based on QoS within the entire target network, and a destination IP address unit.

PDN connection: a connection from a UE to a PDN, that is, an association (or connection) between a UE represented by an IP address and a PDN represented by an APN. It means a connection between entities (i.e., UE-PDN GW) within a core network so that a session may be formed.

UE context: information about the situation of a UE which is used to manage the UE in a network, that is, the situation information including a UE ID, a mobility (e.g., a current location), and the attributes of a session (e.g., Quality of Service (QoS), priority, etc.).

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2A:
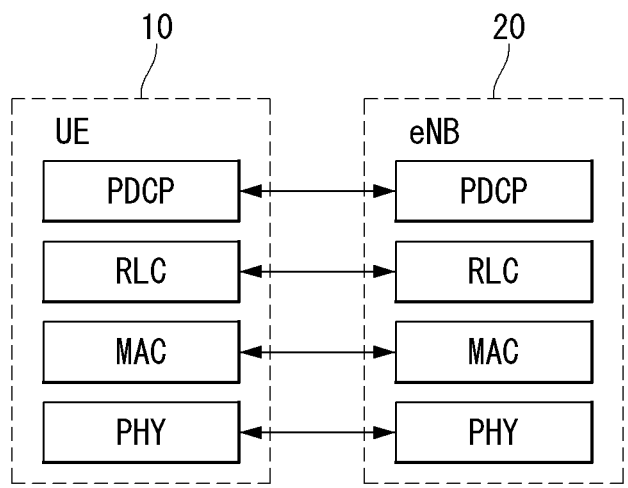
FIG. 2a is a block diagram illustrating an example of a radio protocol architecture for a user plane.
Figure 2B:
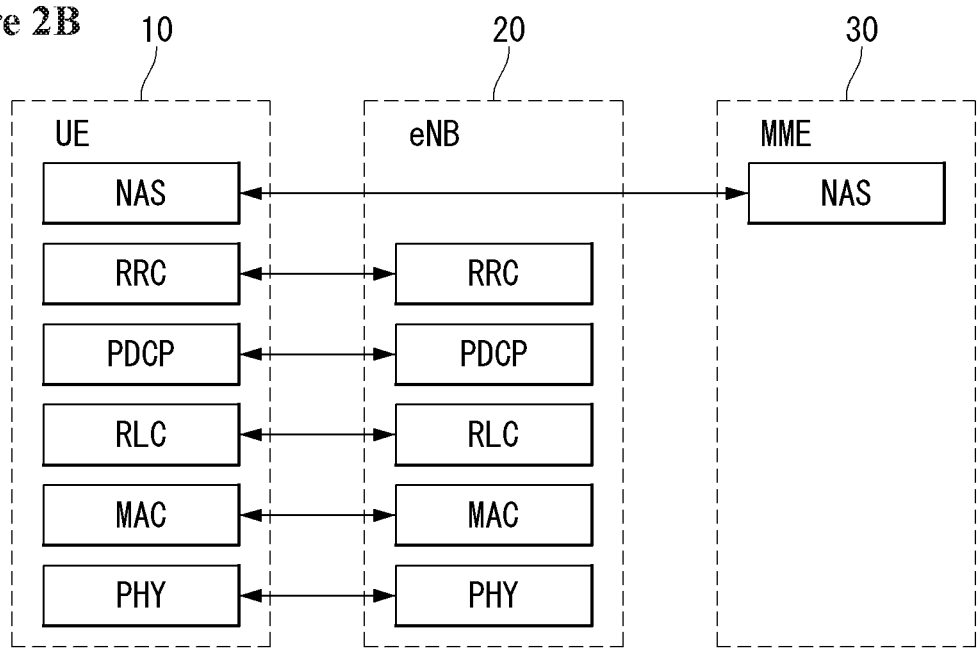
FIG. 2b is a block diagram illustrating an example of a radio protocol architecture for a control plane.

FIG. 2(a) is a diagram illustrating a radio protocol architecture for a user plane. FIG. 2(b) is a diagram illustrating a radio protocol architecture for a control plane.

The user plane is a protocol stack for user data transmission. The control plane is a protocol stack for control signal transmission.

Referring to FIGS. 2(a) and 2(b), a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Figure 3:
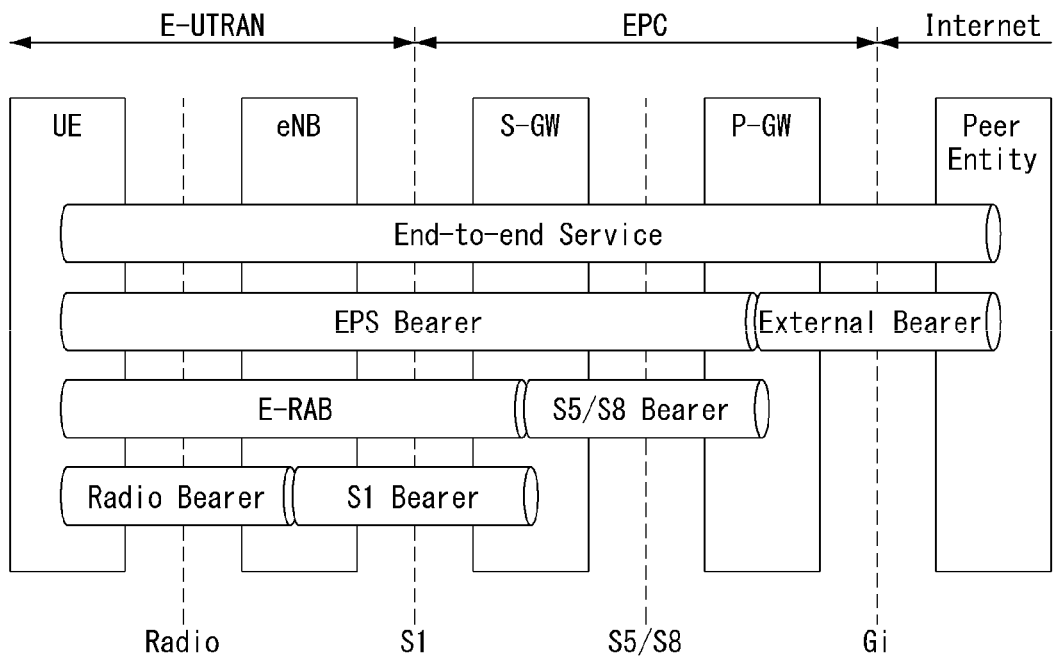
FIG. 3 illustrates a bearer structure in a wireless communication system to which the present invention may be applied.

FIG. 3 illustrates a bearer structure in a wireless communication system to which the present invention may be applied.

When a UE is connected to a Packet Data Network (PDN) (which is the peer entity of FIG. 7), a PDN connection is established, which may also be called an EPS session. The PDN provides a service function such as the Internet or IP Multimedia Subsystem (IMS) through an external or internal IP network of a service provider.

An EPS session comprises one or more EPS bearers. The EPS bearer refers to the transmission path of traffic generated between the UE and the PDN GW for the EPS to deliver user traffic. One or more EPS bearers may be set up for each UE.

Each EPS bearer may be classified into E-UTRAN Radio Access Bearer (E-RAB) or S5/S8 bearer, and the E-RAB may be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. When an E-RAB is existed, the E-RAB bearer is one-to-one mapped to the EPS bearer. A Data Radio Bearer (DRB) delivers packets of the EPS bearer between the UE and the eNB. When a DRB is existed, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is an IP flow or a group of IP flows obtained by classifying (or filtering) user traffic according to an individual service. A plurality of SDFs may be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs may be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer may be one of two types: a default bearer and a dedicated bearer. The UE may have one default bearer and one or more dedicated bearers for each PDN. The minimum basic bearer that the EPS session may have with respect to one PDN is called the default bearer.

The EPS bearer may be classified on the basis of its identity. The EPS bearer identity is allocated by the UE or the MME. The dedicated bearer(s) is combined with the default bearer by a Linked EPS Bearer Identity (LBI).

When the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And when new traffic is generated in the corresponding PDN, the E-RAB bearer is reconfigured to deliver traffic.

When the UE attempts to use a service of which the Quality of Service (QoS) (e.g., Video on Demand (VoD) service, etc.) may not be supported by the default bearer while using a service (e.g., the Internet) through the default bearer, a dedicated bearer is created when the UE demands the high QoS service. In the case there is no traffic from the UE, the dedicated bearer is released. The UE or the network may create a plurality of dedicated bearers depending on needs.

Depending on which service the UE uses, the IP flow may have different QoS characteristics. When the EPS session for the UE is established or modified, the network allocates network resources; or determines a control policy about QoS and applies the policy while the EPS session is maintained. The aforementioned operation is called the Policy and Charging Control (PCC). The PCC rule is determined based on the operation policy (e.g., a QoS policy, gate status, charging method, etc.).

Figure 4:
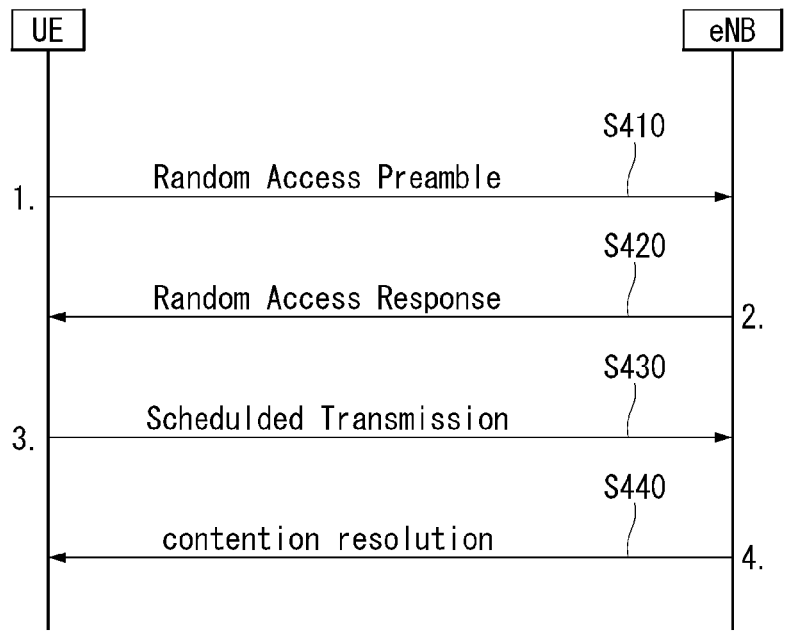
FIG. 4 is a diagram for describing the operation process of a UE and a BS in the contention-based random access procedure.

FIG. 4 is a diagram for describing the operation process of a UE and a BS in the contention-based random access procedure.

(1) First Message Transmission

First of all, a UE randomly selects a random access preamble from a set of random access preambles indicated by the system information or a handover command, selects a PRACH (physical RACH) resource for carrying the random access preamble, and then transmits the random access preamble via the selected PRACH resource (step, S410).

(2) Second Message Reception

A method for receiving random access response information is similar to the non-contention-based random access procedure described above. That is, after the UE has transmitted the random access preamble in the step S410, the UE attempts a reception of its random access response in a random access response receiving window indicated by a base station through the system information or the handover command, and receives a PDSCH through the corresponding RA-RNTI information (step, S420). Through this, the UE may receive a UL grant, a temporary cell identifier (temporary C-RNTI), a time synchronization correction value (timing advance command: TAC) and the like.

(3) Third Message Transmission

When the UE receives the random access response that is valid, the UE processes the information included in the random access response. In particular, the UE applies the TAC and saves the temporary C-RNTI. Moreover, the UE transmits the data (i.e., the third message) to the BS (step, S430) by using the UL approval. The third message should include the identifier of UE. In the contention-based random access procedure, a BS is unable to determine which UEs perform the random access procedure. In order to resolve the contention later, the BS needs to identify a UE.

As a method of including an identifier of a UE, two kinds of methods have been discussed. According to a first method, if a UE has a valid cell identifier already allocated by a corresponding cell prior to the random access procedure, the UE transmits its cell identifier via UL transmission signal corresponding to the UL grant. On the contrary, if the UE fails to receive the allocation of a valid cell identifier prior to the random access procedure, the UE transmits its unique identifier (e.g., S-TMSI or random ID (random identifier)). In general, the unique identifier is longer than the cell identifier. If the UE transmits data corresponding to the UL grant, the UE initiates a contention resolution timer for resolving contention.

(4) Fourth Message Reception

After the UE has transmitted the data including its identifier via the UL grant included in the random access response, the UE waits for an instruction from the BS for the contention resolution. In particular, the UE may attempt a reception of PDCCH to receive a specific message (step, S440). As a method of receiving the PDCCH, two kinds of methods have been discussed. As mentioned in the foregoing description, if the third message transmitted in response to the UL grant uses a cell identifier as its identifier, the UE attempts a reception of PDCCH using its cell identifier. If the identifier is a unique identifier, the UE may be able to attempt a reception of PDCCH using a temporary C-RNTI included in the random access response. Thereafter, in the former case, if the PDCCH is received via its cell identifier before expiration of the contention resolution timer, the UE determines that the random access procedure is normally performed and then ends the random access procedure. In the latter case, if PDCCH is received via a temporary C-RNTI before expiration of the contention resolution timer, the UE checks data carried on PDSCH indicated by the PDCCH. If the unique identifier of the UE is included in a content of the data, the UE determines that the random access procedure is normally performed and then ends the random access procedure.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

Figure 5:
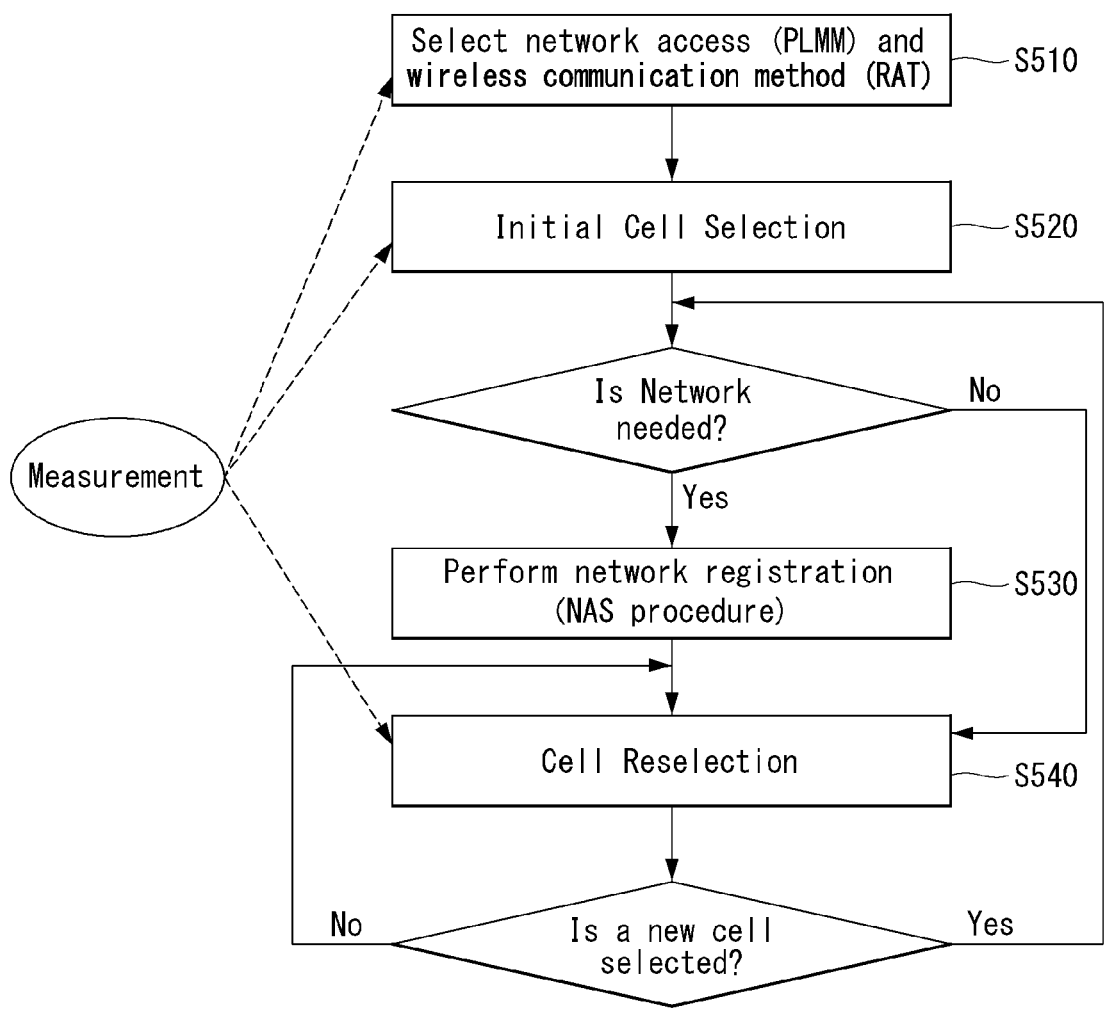
FIG. 5 is a flowchart illustrating a UE operation in an RRC idle state to which the present invention may be applied.

FIG. 5 is a flowchart showing an operation of a UE in RRC_IDLE state to which the present invention can be applied. It is illustrated in FIG. 5 that a procedure of registering a PLMN through a cell selection and performing a cell reselection if needed after the UE is initially turned on.

Referring the FIG. 5, the UE selects a RAT for communicating with a PLMN from which the UE intends to be served (step S510). Information about the PLMN and the RAT may be selected by a user of the UE. The user may use the information stored in a Universal Subscriber Identity Module (USIM).

A UE selects a highest cell among a measured BS and cells having higher quality than a predetermined value (step S520). This procedure is referred as an initial cell reselection, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE performs a network registration if needed (step S530). The UE registers self information (i.e. IMSI) for being served by the network (i.e. paging). The UE does not register whenever the UE selects a cell. When the UE's own information about the network is different from information about the network provided from the system information, the UE performs the network registration procedure.

The UE performs cell reselection based on a service environment or the UE's environment provided from the cell (S540). The UE, when the strength or quality value of a signal, which has been measured from the base station from which the UE is serviced, is lower that a value measured from the base station of a neighbor cell, selects one of other cells providing a better signal characteristic than the base station to which the UE is linked. This process is referred to as cell reselection as distinguished from the initial cell selection of the No. 2 process. At this time, a temporal restricting condition is assigned to prevent cells from being frequently reselected as the signal characteristics vary. The cell reselection procedure is to be described below in detail.

Figure 6:
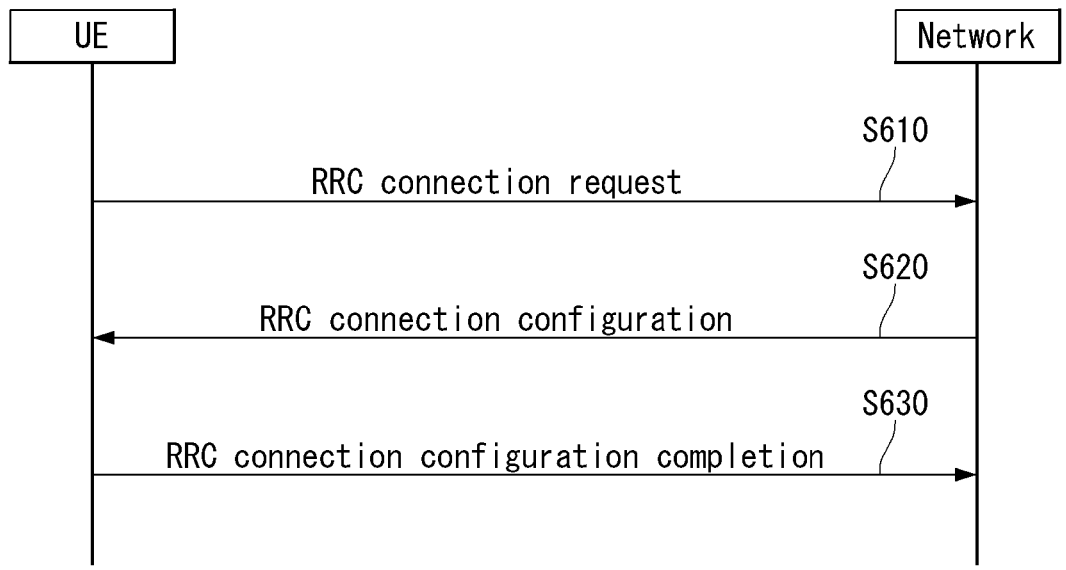
FIG. 6 is a flowchart illustrating an RRC connection establishment procedure state to which the present invention may be applied.

FIG. 6 is a flowchart showing an RRC connection establishment procedure to which the present invention can be applied.

A UE sends to a network an RRC connection request message for requesting an RRC connection (step S610). The network sends an RRC connection setup message in response to the RRC connection request (step S620). After receiving the RRC connection setup message, the UE enters an RRC connection mode.

The UE sends to the network an RRC connection setup complete message used to confirm successful completion of the RRC connection establishment (step S630).

Figure 7:
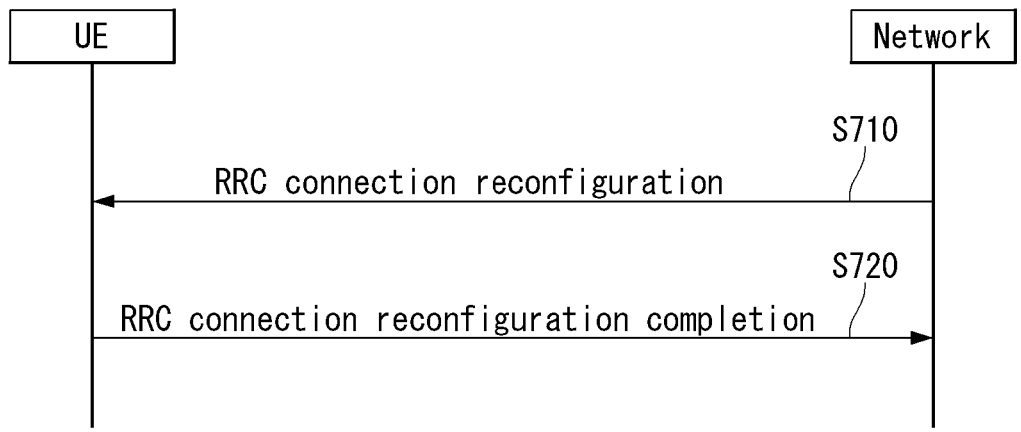
FIG. 7 is a flowchart illustrating an RRC connection reconfiguration procedure to which the present invention may be applied.

FIG. 7 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S710). In response to the RRC connection reconfiguration, the UE sends to the network an RRC connection reconfiguration complete message used to confirm successful completion of the RRC connection reconfiguration (step S720).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) 'User Equipment (UE) procedures in idle mode (Release 8)', a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Hereinafter, RLM (Radio Link Monitoring) is described.

A UE monitors downlink quality based on a cell-specific reference signal in order to detect downlink radio link quality of a PCell.

The UE estimates downlink radio link quality for the purpose of monitoring the downlink radio link quality of the PCell and compares the estimated quality with thresholds Qout and Qin. The threshold Qout is defined as a level where stable reception through a downlink radio link is impossible, and this corresponds to a 10% block error rate of hypothetical PDCCH transmission considering PDFICH errors. The threshold Qin is defined as a downlink radio link quality level at which more stable reception may be made than at the threshold Qout, and this corresponds to a 2% block error rate of hypothetical PDCCH transmission considering PCFICH errors.

Hereinafter, radio link failure (RLF) is described.

A UE continues to perform measurement in order to maintain the quality a radio link with a serving cell receiving a service. The UE determines whether communication is impossible under current the current circumstance due to the quality of the radio link with the serving cell.

If the quality of the serving cell is too low and thus communication is nearly impossible, the UE determines the current circumstance as the radio link failure.

If the radio link failure is determined, the UE abandons maintaining communication with the current serving cell, selects a new cell through a cell selection (or cell reselection) procedure, and attempts an RRC connection reestablishment to the new cell.

The UE, if the following problems occur on the radio link, may determine that RLF has occurred.

(1) First, it may be determined that RLF has occurred due to a physical channel problem.

(2) It may be determined that RLF has occurred due to MAC random access problem

The UE, while performing the random access procedure at the MAC layer, goes through random access resource selection->random access preamble transmission->random access response reception->contention resolution. The above overall process is referred to as one random access procedure, and unless this procedure is successfully done, a next random access procedure is carried out after wait as long as a backoff time. If such random access procedure is unsuccessful despite a predetermined number of times (e.g., preambleTransMax) of attempts, this is informed to the RRC that then determines that RLF has occurred.

(3) It may be determined that RLF has occurred due to RLC maximum retransmission problem.

The UE, in case AM (Acknowledged Mode) RLC is used by the RLC layer, retransmits an RLC PDU that was not successfully transmitted.

However, if despite a predetermined number of times (e.g., maxRetxThreshold) of attempts to retransmit to a specific AMD PDU the AM RLC fails to transmit, this is informed to the RRC, and the RRC determines that RLF has occurred.

The RRC determines the occurrence of RLF for the three reasons as above. If RLF occurs so, an RRC connection reestablishment is performed that is a procedure to reestablish RRC connection with the eNB.

The RRC connection reestablishment procedure that is performed when RLF occurs is as follows.

The UE, if determining that a serious problem has occurred in the RRC connection itself, performs an RRC connection reestablishment procedure in order to reestablish a connection with the eNB. The serious problem with the RRC connection may include the following: (1) radio link failure (RLF); (2) handover failure; (3) mobility from E-UTRA; (4) PDCP integrity check failure; and (5) RRC connection reconfiguration failure.

If one of the above problems occurs, the UE runs the timer T311 and initiates an RRC connection reestablishment procedure. During this procedure, the UE goes through a cell selection random access procedure and is thus linked to a new cell.

If discovering a proper cell through a cell selection procedure while the timer T311 is running, the UE stops the timer T311 and starts a random access procedure to a corresponding cell. However, if failing to discover a proper cell until the timer T311 expires, the UE determines it as RRC connection failure and shifts to RRC_IDLE mode.

The RRC connection reestablishment procedure is now described below in greater detail.

Figure 8:
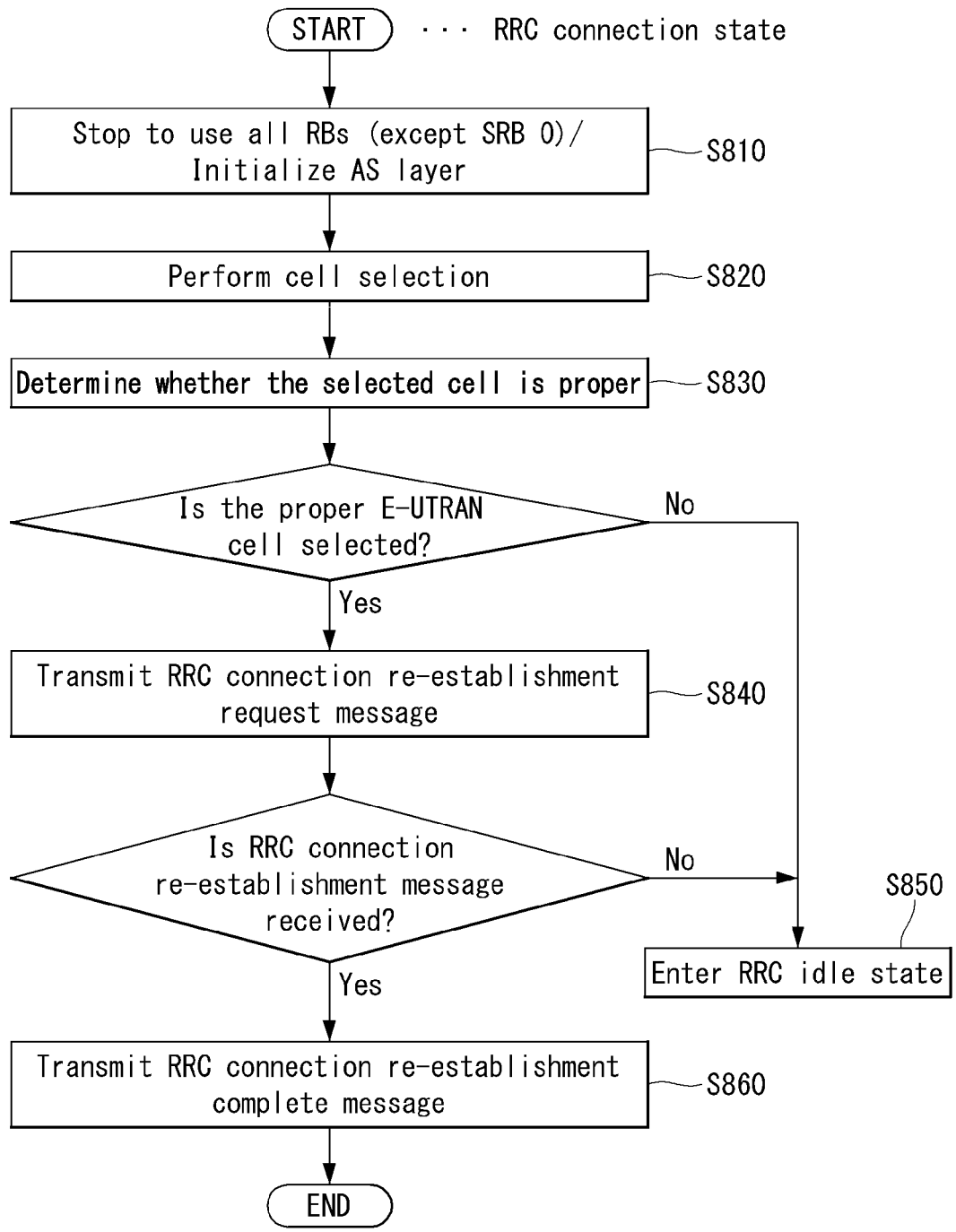
FIG. 8 is a diagram illustrating an example of an RRC connection re-establishment procedure to which the present invention may be applied.

FIG. 8 is a view illustrating an example RRC connection reestablishment procedure to which the present invention may apply.

Referring to FIG. 8, the UE stops using all of the configured radio bearers except SRB 0 (Signaling Radio Bearer #0) and initializes various sub-layers of AS (Access Stratum) (S810). Further, the UE sets up each sub-layer and physical layer as default configuration. During such procedure, the UE maintains the RRC connection state.

The UE performs a cell selection procedure for conducting an RRC connection reestablishment procedure (S820). Although the UE maintains the RRC connection state during the RRC connection reestablishment procedure, the cell selection procedure may be performed like the cell selection procedure performed by the UE in the RRC idle mode.

After performing the cell selection procedure, the UE identifies the system information on a corresponding cell to determine whether the corresponding cell is a proper cell (S830). In case the selected cell is determined to be a proper E-UTRAN cell, the UE sends an RRC connection reestablishment request message to the corresponding cell (S840).

On the other hand, in case the cell selected through the cell selection procedure for performing the RRC connection reestablishment procedure is determined to be a cell using other RAT than the E-UTRAN, the UE stops the RRC connection reestablishment procedure and enters the RRC idle mode (S850).

The UE may be implemented to finish identifying whether the cell is proper within a limited time through the cell selection procedure and reception of the system information on the selected cell. To that end, the UE may run a timer as the UE initiates the RRC connection reestablishment procedure. The timer, when the UE is determined to have selected a proper cell, may stop. In case the timer expires, the UE considers it as failure of the RRC connection reestablishment procedure and may enter the RRC idle mode. This timer is hereinafter referred to as a radio link failure timer. According to the LTE spec. TS 36.331, a timer denoted T311 may be utilized as the radio link failure timer. The UE may obtain configuration values of the timer from the system information of the serving cell.

When receiving the RRC connection reestablishment request message from the UE and accepting the request, the cell transmits an RRC connection reestablishment message to the UE.

When receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

By doing so, SRB 1 between the UE and the cell is opened, and RRC control messages may be communicated therebetween. The UE completes resuming SRB1 and sends to the cell an RRC connection reestablishment complete message indicating that the RRC connection reestablishment procedure has been complete (S860).

On the contrary, unless the cell receives the RRC connection reestablishment request message from the UE and accepts the request, the cell transmits an RRC connection reestablishment reject message to the UE.

If the RRC connection reestablishment procedure is successfully done, the cell and the UE perform an RRC connection reestablishment procedure. By doing so, the UE recovers to the state before performing the RRC connection reestablishment procedure and maximally guarantees service continuity.

RLF reporting is now described.

The UE, if RLF occurs or handover failure occurs, reports such failure event to the network in order to support MRO (Mobility Robustness Optimization) of the network.

After RRC connection reestablishment, the UE may provide an RLF report to the eNB. The radio measurement included in the RLF report may be used as potential reasons of failure in order to identify coverage problems. Such information may be used to exclude such events from MRO evaluation regarding intra-LTE mobility connection failure and use such events as inputs for other algorithms.

In case the RRC connection reestablishment fails or the UE cannot perform the RRC connection reestablishment, the UE may generate a valid RLF report for the eNB after reconnection in idle mode. For such purpose, the UE may store the latest RLF or handover failure-related information and may indicate to the LTE cell that the RLF report is valid per subsequent RRC connection (re)establishment and handover until the RLF report is called in by the network or for 48 hours after the RLF or handover failure is detected.

The UE maintains the information during the state transition and RAT variation, and after returning to the LTE RAT, indicates again that the RLF report is valid.

The RLF report being valid in the RRC connection reestablishment procedure indicates that the UE has received interference such as connection failure and due to such failure the RLF report has not been yet transferred to the network. The RLF report from the UE contains the following information.

- E-CGI of target for handover or the last cell (in the case of RLF) that has provided service to the UE. If the E-CGI has not been known, PCI and frequency information are instead used.
- E-CGI of cell in which reestablishment attempt has been done Upon the last handover initialization, as an example, when message 7 (RRC connection reestablishment) has been received by the UE, E-CGI of the cell that has provided service to the UE elapsed time from the last handover initialization to connection failure information indicating whether connection failure has come from RLF or handover failure radio measurements position of failure When receiving the RLF failure from the UE, the eNB may forward the report to the eNB that provided service to the UE before the reported connection failure. The radio measurements contained in the RLF report may be used to identify coverage issues as potential causes of the radio link failure. Such information may be used to exclude such events from the MRO evaluation of the intra-LTE mobility connection failure and resend the same to inputs in other algorithm.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 9:
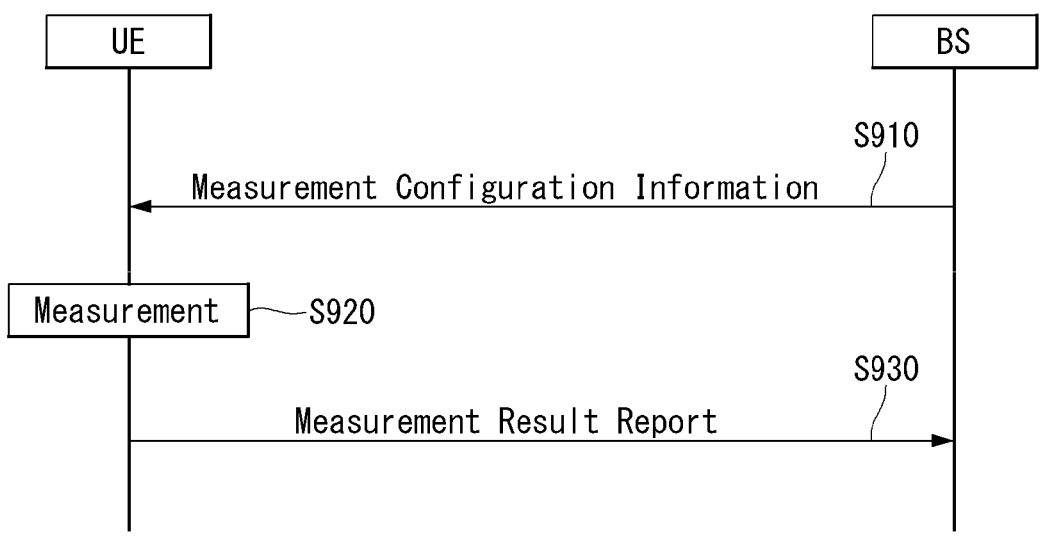
FIGS. 9 and 10 are diagrams illustrating a method for performing a measurement and a configuration of measurement interval to which the present invention may be applied.
Figure 10:
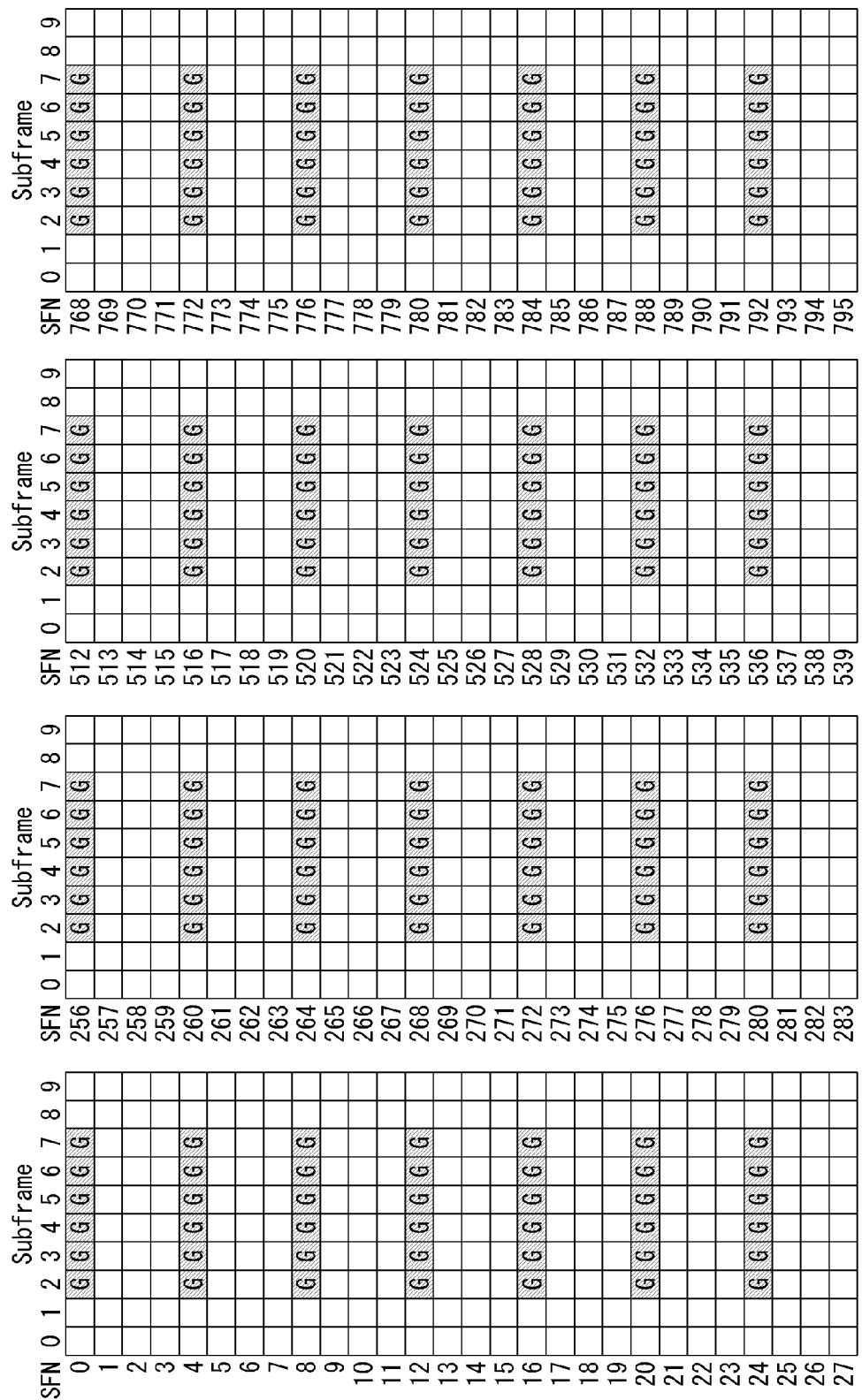

FIGS. 9 and 10 are diagrams illustrating a method for performing a measurement and a configuration of measurement interval to which the present invention may be applied.

A UE receives measurement configuration information from a BS (step, S810). A message including the measurement configuration information is referred to as a measurement configuration message. The UE performs measurement based on the measurement configuration information (step, S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object information: The information is on which the UE performs the measurements. The measurement object includes at least one of an intra-frequency measurement object which is an object of intra-cell measurement, an inter-frequency measurement object which is an object of inter-cell measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration information: The information is on a reporting condition and a reporting type about the timing of reporting the transmitted measurement result. The reporting configuration information may include a list of reporting configurations. Each of the reporting configurations may include a reporting criterion and a reporting format. The reporting criterion is used to trigger the UE to send a measurement report and may either be periodical or a single event description. The reporting format is information on which type of the measurement result is configured.

(3) Measurement identity information: This information is on a measurement identity that enables the UE to determine to report for which measurement object and on which type and when to report it by linking the measurement object with the reporting configuration. The measurement identity information may be included in the measurement report message to indicate a specific measurement object for which the measurement result is obtained and a specific reporting condition according to which the measurement report is triggered.

(4) Quantity configuration information: This information is on a parameter for configuring filtering of a measurement unit, a report unit and/or a measurement result value.

(5) Measurement gap information: This information is on a measurement gap, which is a period that the UE may use to perform measurements only without considering a data transmission with a serving cell. That is, no data is transmitted and received during the measurement gap.

Table 1 below represents an example of a pattern of the measurement gap.

TABLE 1

| Gap pattern ID | Measurement gap length (MGL, ms) | Measurement gap repetition period (MGL, ms) | Minimum use time for measuring inter frequency and an inter-RAT measurement during 480 ms | Object of measurement |
|---|---|---|---|---|
| 0 | 6 | 40 | 60 | Inter-Frequency E-UTRAN DFF and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

FIG. 10 illustrates an example of the measurement gap is configured in the case that a gap pattern is set to 40 ms and a gap offset is set to 2.

A UE has a measurement object list, a measurement reporting configuration list and a measurement identity list in order to perform the measurement procedure.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 2

| Event | Reporting Condition |
|---|---|
| Event A1 | Serving becomes better than threshold |
| Event A2 | Serving becomes worse than threshold |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 11:
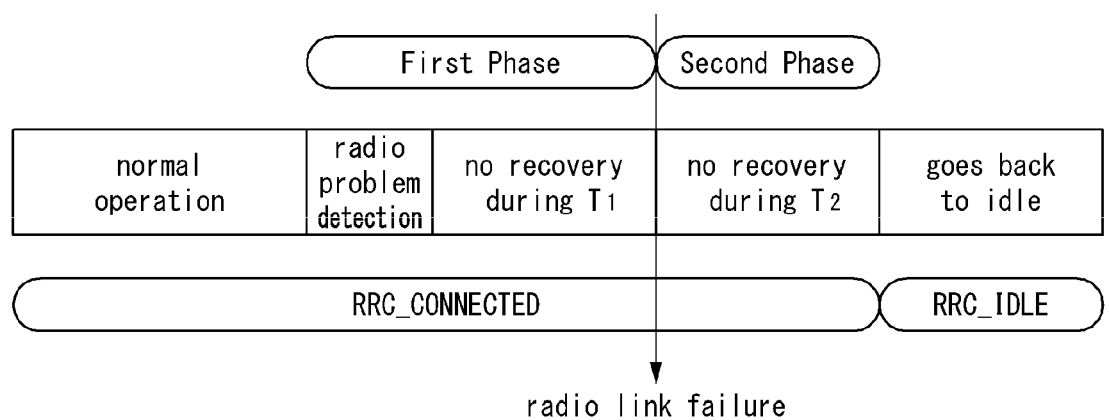
FIG. 11 is a diagram illustrating an example of two steps for controlling the operation related to a radio link failure.

FIG. 11 is a diagram illustrating an example of two steps for controlling the operation related to a radio link failure.

In the conventional cellular system such as LTE/LTE-A, as shown in FIG. 11, a plurality of timer-based operations is defined as a method for recovering the Radio Link Failure (RLF) of a UE.

In the system using such a method, when a UE receives N310 consecutive "Out-of-Sync" Indications from a lower layer (e.g., PHY) while performing a normal operation, the UE identifies that a physical layer problem occurs (radio problem detection) and starts T310 timer.

Later, when the UE receives N311 consecutive "In-Sync" Indication from a lower layer before the T310 timer is terminated, the UE terminates the T310 timer and maintains the current RRC connection without explicit signaling.

In FIG. 11, the first phase may include (1) radio problem detection section and (2) the section until the T310 timer is terminated after driving the T310 timer ($T_1$).

On the other hand, when i) the T310 timer is terminated, ii) the UE receives a Random Access Problem Indication from the MAC, or iii) the UE receives the notifying that the maximum number of retransmission count is attained for the SRB or DRB from the RLC, the UE identifies that the RLF occurs and starts the RRC Connection Re-establishment procedure.

In FIG. 11, the second phase includes the section of the time from which a radio link failure occurs (the time when the T310 timer is terminated) to the time when the T311 timer ($T_2$) is terminated.

That is, the UE performs the RRC Connection Re-establishment procedure in the second phase.

As described by reference to FIG. 11, in the case of controlling the RLF based on a plurality of timers, even though a UE identifies the physical layer problem, the UE should perform the RRC Connection Re-establishment procedure after identifying that the RLF occurs waiting till the termination of timers (e.g., T310 and T312) configured as a certain value.

That is, the UE starts the T311 timer while performing the RRC Connection Re-establishment procedure, and when the RRC Connection Re-establishment procedure is failed before the T311 timer is terminated, the state is switched to the RRC Idle state.

Figure 12:
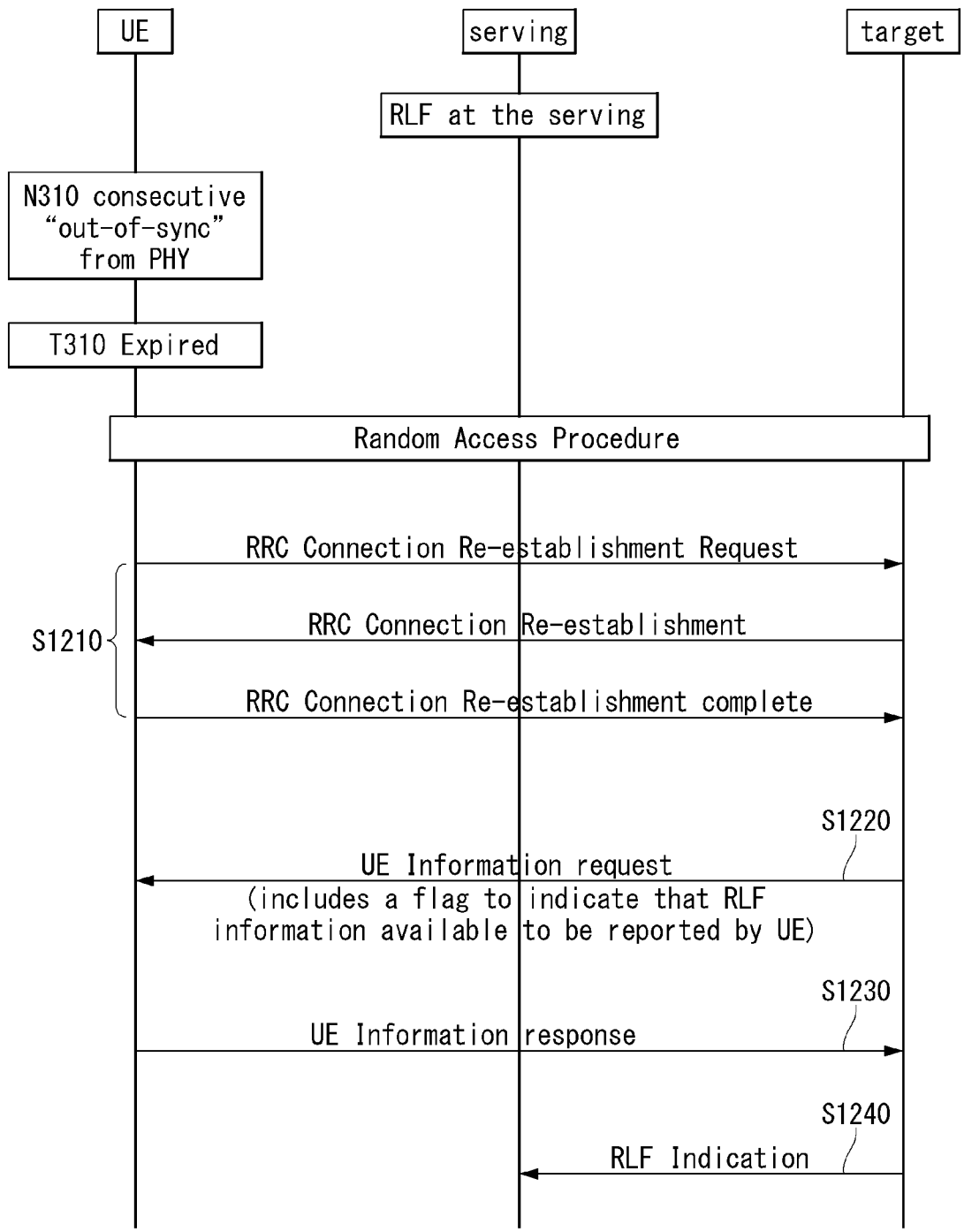
FIG. 12 is a flowchart illustrating an example of a radio link failure (RLF) recovery defined in the LTE/LTE-A system.

FIG. 12 is a flowchart illustrating an example of a radio link failure (RLF) recovery defined in the LTE/LTE-A system.

Referring to FIG. 12, a UE that identifies the RLF from the occurrence of a case among those described above, performs the RRC Connection Re-establishment procedure (step, S1210).

Through this, the UE delivers a flag notifying that there is the RLF information to be reported to a target BS of the RRC Connection Re-establishment.

Herein, the flag notifying that there is the RLF information to be reported is included in a RRC Connection Re-establishment completion message.

Later, the target BS that receives the RRC Connection Re-establishment completion message from the UE identifies the corresponding flag, and requests the UE to report the RLF information (step, S1220).

Herein, the request of reporting the RLF information to the UE may be performed through a UE Information Request message.

In response to the UE Information Request message, the UE transmits a UE Information Response message (S1230) to the corresponding target BS in order to report the RLF information.

Later, the target BS detects the BS in which the RLF occurs, and notifies the occurrence of the RLF for the UE to the BS in which the RLF occurs (step, S1240).

Hereinafter, a method will be described for avoiding the radio link failure in order to prevent the Link Outage of a UE that does not have the multiple connections with a plurality of (alternative) BSs proposed in the present disclosure.

That is, the present disclosure relates to a method for avoiding the case that the RLF is anticipated since the link quality of a serving BS is abruptly degraded, in order to provide new 5G specific services (e.g., MCS) with high service availability.

For the convenience of description, it will be described to exemplify the MCS as an example of the specific service.

In this case, it is assumed that a UE that is provided with a specific service (e.g., MCS) configures the connection of an active state to a serving BS, and configures the connection of an inactive state to a plurality of alternative BSs.

Here, the case that the UE configures the connection of an inactive state to a plurality of alternative BSs may mean the configuration of an alternative link.

The alternative link represents the radio link between a UE and at least one alternative BS, and represents the state that only the SRB of the inactive state is configured and the DRB is not configured.

In addition, the alternative link is activated only by the instruction of the activation form a serving BS, and may be an event-triggered dormant mode as a link concept that has a different state from a general dormant mode.

That is, the alternative link that is connected in the SRB inactive state with an alternative BS maintains a sleep state in the alternative link continuously until the instruction for activating is made by a UE.

In the case that the RLF is anticipated since the link quality of a serving BS is abruptly degraded, the UE provided with the MCS fails to satisfy the requirement of target reliability of the corresponding MCS owing to the continuity damage of providing the MCS.

Accordingly, a method is required for the UE to anticipate and avoid the potential RLF through the alternative BSs that are already secured.

That is, in the coverage state of a UE, when there are Multi-Tier/Multi-Layer BSs around, when the RLF is anticipated owing to the abrupt degradation of the link quality of serving BS, or when there is no multiple connection configuration that is already secured, the present disclosure provides a method for continuously providing the MCSs that require high reliability to the corresponding UE by minimizing the damage in the continuity of providing the MCS by avoiding the potential RLF.

This method is designed to decrease the state in which the RRC connection is not established, which inevitably occurs until the RRC Connection Re-establishment is successfully completed in the RLF control method of the conventional LTE/LTE-A system.

Figure 13:
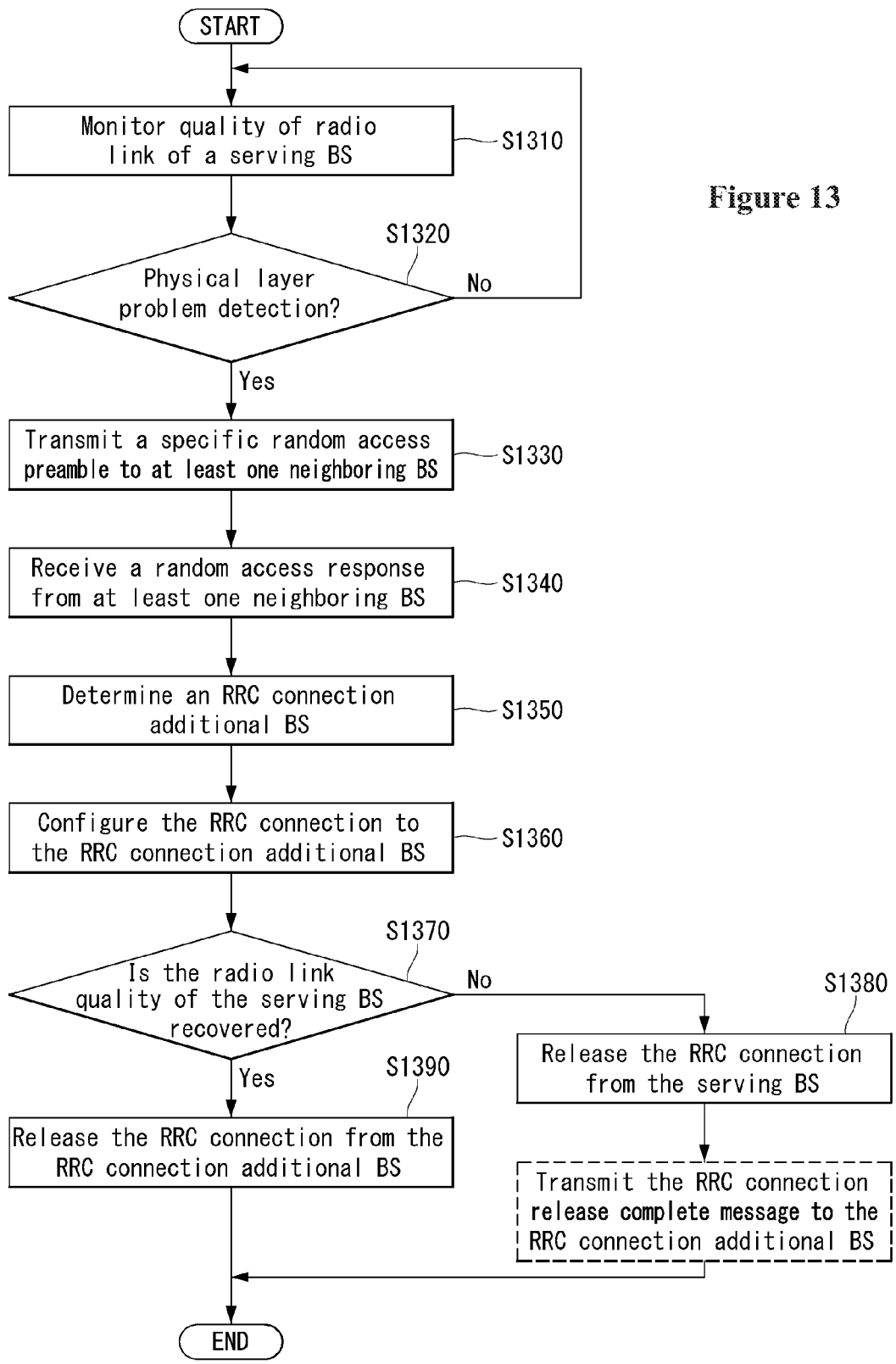
FIG. 13 is a flowchart illustrating a method for avoiding the radio link failure proposed in the present disclosure.

FIG. 13 is a flowchart illustrating a method for avoiding the radio link failure proposed in the present disclosure.

A UE continuously perform a measurement or monitoring in order to maintain the quality of radio link of a serving BS (or serving cell) (step, S1310).

Later, the UE checks whether the quality of radio link of the serving BS is degraded.

That is, the UE checks whether to detect the physical layer problem (step, S1320).

Then, in the case that the UE senses (or detects) that the quality of radio link of the serving BS is abruptly degraded, the UE transmits a specific random access preamble to at least one neighboring BS through a specific PRACH resource (step, S1330).

In this case, it is preferable that the UE transmits the specific random access preamble with driving a first timer (e.g., T310 timer) (or right after detecting the physical layer problem), and at the latest, before the first timer is terminated, transmission should be completed.

The first timer corresponds to a timer related to the RLF, and may mean the T310 timer.

Herein, the meaning that the quality of radio link of the serving BS is abruptly degraded may be interpreted as a problem occurs in the physical layer (or radio problem detection).

As an example, when a UE receives N310 consecutive "out-of-sync" indications from a physical layer, the UE detects or identifies that a problem occurs in the physical layer.

The specific random access preamble is a preamble related to an additional RRC connection configuration, and particularly, means the random access preamble that is used for a UE to configure an additional (or redundant) RRC connection with a neighboring BS(s) owing to the potential RLF.

The information related to the specific random access preamble may be included in the system information.

In addition, the specific Physical Random Access Channel (PRACH) resource may be the PRACH resource that is defined in the conventional LTE(-A), or the PRACH resource that is separately configured from the conventional PRACH resource.

However, since the specific random access preamble should be transmitted to at least one neighboring BS at one time, it is preferable that the specific PRACH resource is separately configured from the conventional PRACH resource.

In this case, the specific PRACH resource may be defined by a common PRACH resource.

Later, the UE receives a random access response from at least one neighboring BS (step, S1340).

The random access response may include the cell ID of each neighboring BS, the load status information (High, Medium, Low), the resource ID in which the preamble is detected (e.g., the RA-RNTI in LTE), the TA, the UL resource scheduling information, and the like.

Then, the UE determines a BS (hereinafter, 'RRC connection additional BS') to which the additional RRC connection is configured based on the received random access response (step, S1350).

For the convenience of description, the BS to which the RRC connection is additionally set with the UE except the serving BS is referred to as or called the 'RRC connection additional BS'.

Later, the UE configures the RRC connection to the RRC connection additional BS (step, S1360).

The RRC connection configuration includes the procedures of the transmission/reception of RRC connection request message, the transmission/reception of RRC connection setup message and the transmission/reception of RRC connection setup complete message.

In addition, after step S1360, the UE may perform the following procedures.

That is, the UE checks whether the radio link quality of the serving BS is improved (or recovered) again till the first time is terminated (step, S1370).

That is, the UE checks whether the physical layer problem is solved.

As a result of the checking, when the radio link quality of the serving BS is not recovered till the first time is terminated, the UE determines the RLF to be occurred and releases the RRC connection with the serving BS (step, S1380).

That is, after the UE transmits the RRC connection setup complete message to the RRC connection additional BS, the RRC connection additional BS transmits the RRC connection release request message that requests the serving BS to release the RRC connection.

Later, when the RRC connection release procedure from the UE is completed, the serving BS transmits the RRC connection release complete message to the RRC connection additional BS.

However, the process of transmitting the RRC connection release complete message may be omitted as occasion demands.

On the contrary, as a result of checking whether the radio link quality of the serving BS is improved (or recovered) again until the first time is terminated, in the case that the radio link quality of the serving BS is recovered until the first time is terminated, the UE maintains the RRC connection with the serving BS, determines the RRC connection release from the RRC connection additional BS, and performs the RRC connection release from the RRC connection additional BS (step, S1390).

That is, the UE transmits the RRC connection release request message that requests the RRC connection additional BS to release the RRC connection.

Next, referring to FIG. 14, the procedure of releasing the RRC connection from the serving BS since the radio link quality of the serving BS is not recovered, and referring to FIG. 15, the method for maintaining the RRC connection configuration with the serving BS since the radio link quality of the serving BS is recovered will be described in more detail.

Figure 14:
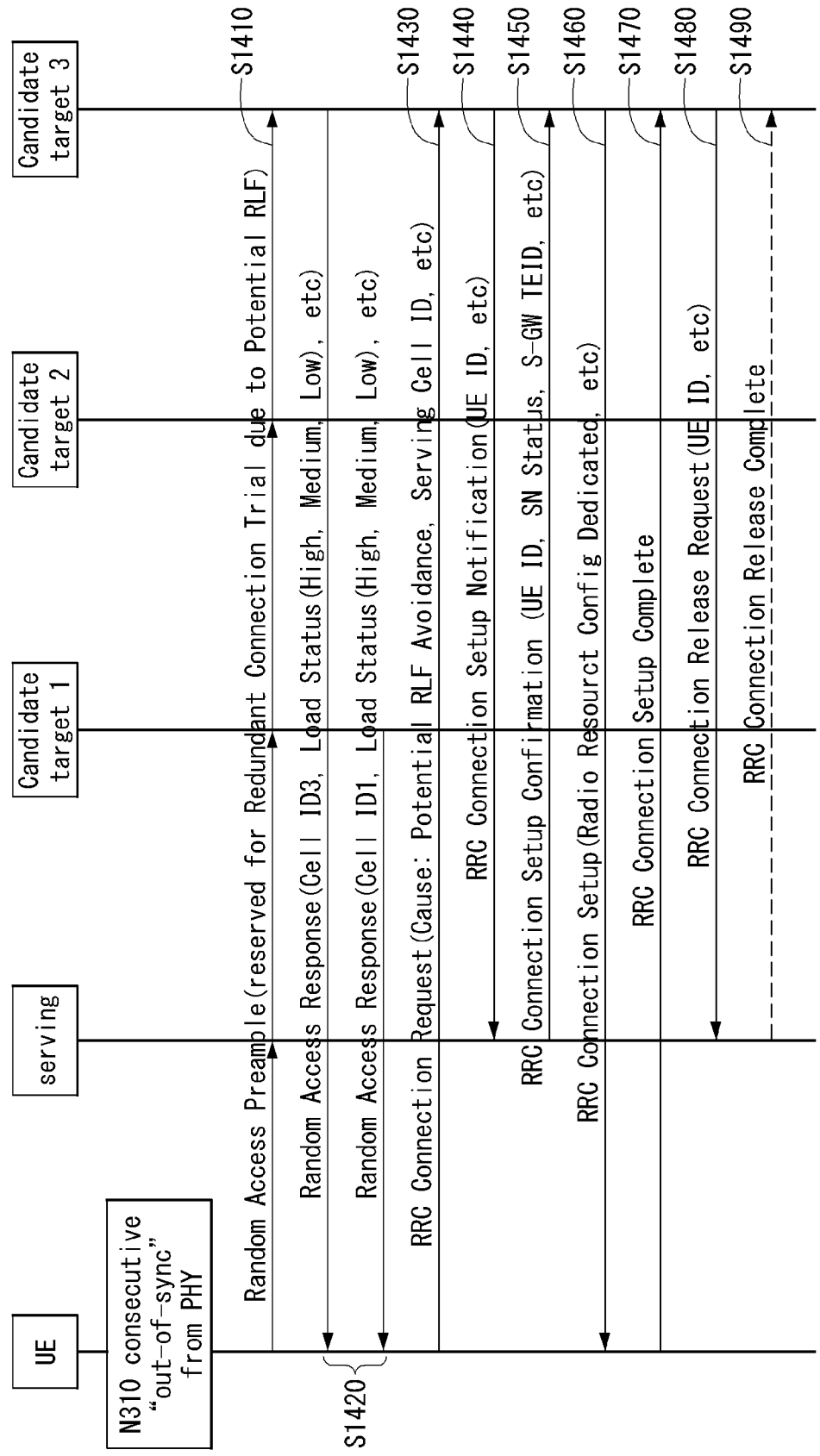
FIG. 14 is a flowchart illustrating an example of a method for avoiding the radio link failure proposed in the present disclosure.
Figure 15:
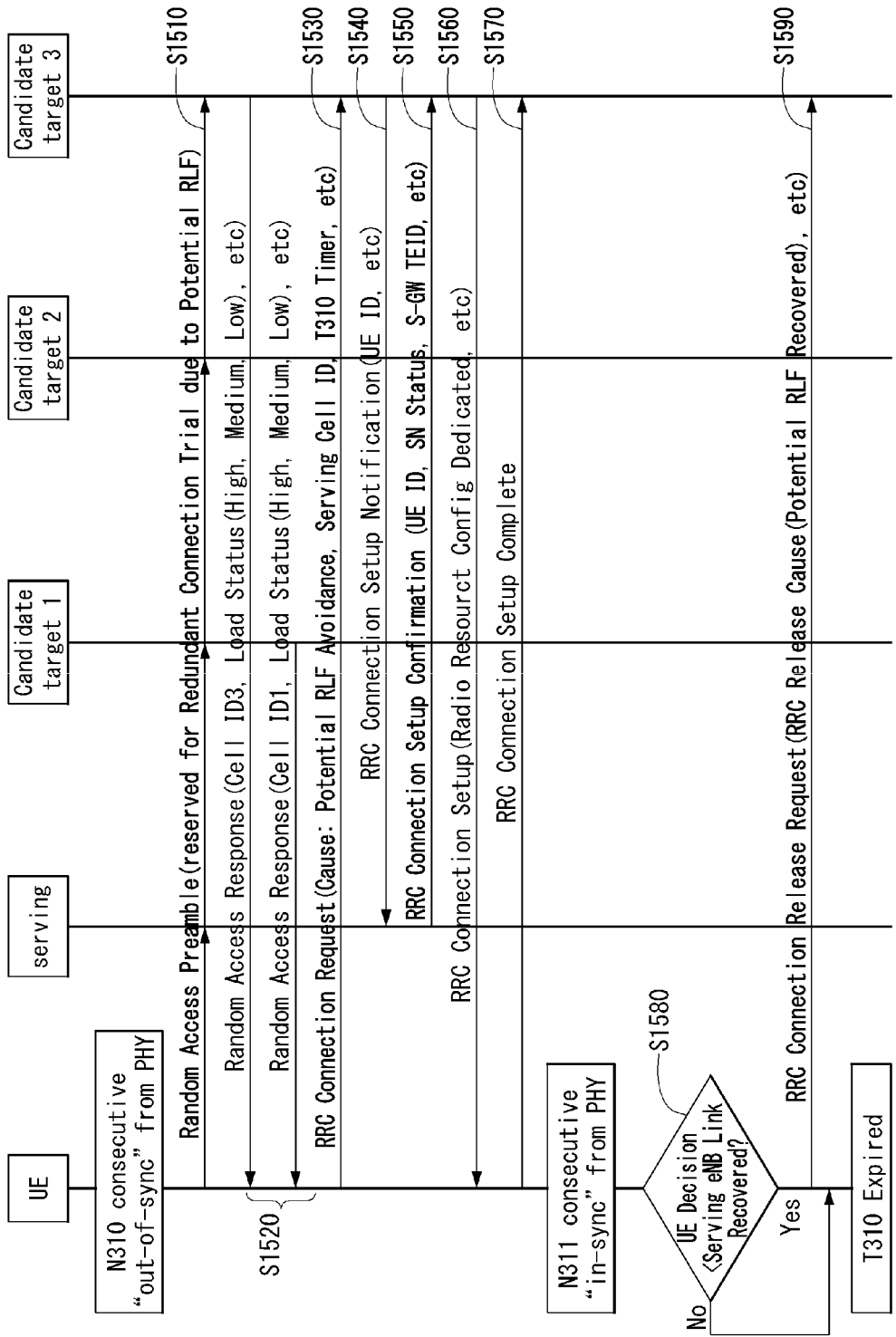
FIG. 15 is a flowchart illustrating another example of a method for avoiding the radio link failure proposed in the present disclosure.

FIGS. 14 and 15 are flowcharts illustrating examples of a method for avoiding the radio link failure proposed in the present disclosure.

When the radio link failure (RLF) is anticipated since the radio link signal quality of a serving BS is abruptly degraded in the state that a UE accesses a network through the serving BS and configures an EPS bearer, FIGS. 14 and 15 show the examples of a method for a UE to avoid the RLF by transmitting a specific Random Access Preamble that all other BSs located near to the serving BS are able to receive, which is performed by the UE.

The state of configuring the EPS bearer is referred to as a state in which the UE secures the Data Radio Bearer (DRB) ID of a Radio section and the EPS Bearer ID of the network section.

In addition, as described above, the specific Random Access Preamble is referred to as a newly defined Preamble that is intended to configure an additional or redundant RRC connection as a potential RLF occurs.

The following assumption is presumed for FIGS. 14 and 15, and the PRACH resource described in the present disclosure may mean the time, frequency and sequence resources for a UE to transmit the Random Access Preamble.

The serving BS/neighboring BSs that use the same frequency band receive the specific Random Access Preamble that a UE transmits through a specific PRACH resource together.

As described above, the specific Random Access Preamble is referred to as a newly defined Preamble that is intended to configure a redundant RRC connection as a potential RLF occurs, and may use a reserved random access preamble.

For example, the serving BS and the neighboring BSs are synchronized, and the PRACH resource of a specific object may be identically configured to the serving BS and the neighboring BSs.

Herein, for example, the specific object represents an object of indicating to configure a redundant RRC connection owing to the occurrence of potential RLF.

Accordingly, after detecting that the signal quality of a serving BS is degraded, a UE notifies (or transmits) the detection to a neighboring BS(s) at a time using the specific PRACH resource and/or the specific Random Access Preamble.

Herein, the expression of notifying the detection to a neighboring BS(s) at a time may be interpreted as the UE transmits (i.e., broadcasts) the specific Random Access Preamble to the neighboring BS(s) through a common PRACH resource.

Later, the UE may configure the RRC connection to the BS(s) to which the specific Random Access Preamble is transmitted.

As described above, when a potential RLF is detected, the specific Random Access Preamble may correspond to the Preamble Sequence Group which is pre-allocated to perform an additional or redundant RRC connection configuration.

In addition, when a plurality of sequences is included in the Preamble Sequence Group of the object mentioned above, the UE may arbitrarily select the sequence in the Preamble Sequence Group of the object for the Contention Resolution.

Otherwise, the PRACH resource for transmitting the Random Access Preamble of the object may be separately configured from the existing PRACH resource.

In this case, when the UE detects that the signal quality of the serving BS is degraded, the UE transmits the Random Access Preamble of the object in the PRACH resource described above.

This will be described in more detail by reference to FIG. 14.

First, while the UE monitors the signal quality of the serving BS link, the UE identifies whether the signal quality of the radio link of the serving BS is abruptly degraded.

Herein, the case that the signal quality of the radio link of the serving BS is abruptly degraded may be the case of receiving N310 consecutive out-of-sync. Indications from a lower layer (e.g., PHY).

Later, when the signal quality of the radio link of the serving BS is abruptly degraded, the UE notifies the corresponding fact to the neighboring BSs of the serving BS.

That is, the UE notifies to configure a redundant RRC connection since a potential RLF is anticipated to the neighboring BSs by transmitting the specific Random Access Preamble to the neighboring BSs using the specific PRACH resource (step, S1410).

Later, the neighboring BSs that receive the specific Random Access Preamble transmits the Random Access Response that includes at least one of the cell ID of their own, the resource ID (e.g., the RA-RNTI in LTE) in which the specific Random Access Preamble is detected, the Timing Adjustment value, the UL resource scheduling information for a message transmission in step S430 shown in FIG. 4 and the Load state information (step, S1420).

Then, the UE determines the BS (additional BS for the RRC connection) to which the redundant RRC connection is to be configured, and transmits a RRC Connection Request message to the determined BS (step, S1430).

In this case, when determining the BS to which the redundant RRC connection is to be configured, the Load state information of the corresponding BSs received from the neighboring BSs may be considered.

The RRC Connection Request message may include the Cause information of the RRC connection, the cell ID information of the serving BS, and so on.

The Cause information of the RRC connection may be configured by avoiding the potential RLF.

Later, the BS (candidate target 3) that receives the RRC Connection Request message checks the Cause information of the RRC connection included in the RRC Connection Request message, and then, transmits a RRC Connection Setup Notification message to the serving BS (of the UE) (step, S1440).

Then, the serving BS transmits a RRC Connection Setup Confirmation message that includes the information such as the SN status for the UE, the S-GW TEID, and the like to the redundant RRC connection configuration target BS (candidate target 3) (step, S1450).

Herein, the RRC connection configuration target BS means the RRC connection additional BS.

Later, the BS that receives the RRC Connection Setup Confirmation message transmits the RRC Connection Setup message to the UE in order to notify the information related to the radio resource configuration for the UE (step, S1460).

Then, the UE transmits the RRC Connection Setup Complete message to the RRC connection configuration target BS (candidate target 3) (step, S1470).

Later, the redundant RRC connection configuration target BS requests the RRC connection release from the UE to the serving BS (step, S1480), and receives the response from the serving BS (step, S1490).

In summary, according to the method shown in FIG. 14, different from the conventional RLF recovery method, the UE that detects the problem of PHY layer drives the T310 timer, and omits the process of recovering the RRC connection after the corresponding timer is terminated.

That is, according to the method shown in FIG. 14, right after the UE detects the problem of PHY layer, the UE transmits the specific random access preamble to the neighboring BSs in preparation for the case that the RLF occurs, and configures the RRC connection, and decreases the state in which the UE does not establish the RRC connection, thereby the link availability being always secured.

FIG. 15, different from FIG. 14, shows a method for a UE to be able to maintain the RRC connection with the serving BS by requesting the release of the corresponding RRC connection configuration to the redundant RRC connection target BS, when the UE that detects the PHY layer problem runs the T310 timer, similar to the conventional RFL recovering method, may recover the RRC connection with the serving BS before the corresponding timer is terminated.

That is, when the UE detects the PHY layer problem and the link situation of the serving BS is improved after the redundant RRC connection is configured and before the T310 timer is terminated, the UE maintains two RRC connections (with the redundant RRC connection target BS and the serving BS).

However, in the case that the link of the serving BS is not improved even after the T310 timer is terminated, the UE releases the RRC connection from the serving BS.

Different from the method shown in FIG. 14, while the UE configures the redundant RRC connection with a neighboring BS, the UE determines whether to release the redundant RRC connection by considering the situation in which the RRC connection with the serving BS may be recovered.

That is, when the link situation of the serving BS is improved, the UE release the RRC connection from the BS to which the redundant RRC connection is configured, and maintains the RRC connection with the serving BS.

Through this procedure, the UE may secure the link availability always by decreasing the state in which the RRC connection is not established.

This will be described in more detail by reference to FIG. 15.

Since steps S1510 to 1570 are the same with steps S1410 to S1470, the detailed description is to be referred to FIG. 14, and different parts from FIG. 14 will be described.

After step S1570, that is, after the UE transmits the RRC Connection Setup Complete message to the RRC connection configuration target BS, the UE checks whether the link quality of the serving BS is improved since the PHY layer problem of the serving BS is solved before the T310 timer is terminated (step, S1580).

When the link quality of the serving BS is improved, the UE maintains the RRC connection configuration with the serving BS, and determines to release the redundant RRC connection that is configured with the neighboring BS.

Later, the UE transmits the RRC connection release request message for requesting the RRC connection release to the neighboring BS to which the redundant RRC connection is configured (step, S1590).

The RRC connection release request message may be directly requested by the UE to the neighboring BS to which the redundant RRC connection is configured, or requested by the UE to the serving BS and delivered to the neighboring BS to which the redundant RRC connection is configured by the serving BS.

However, in the case that the link quality of the serving BS is not improved since the PHY layer problem of the serving BS is not solved before the T310 timer is terminated in step S1580, the UE maintains the redundant RRC connection that is configured with the neighboring BS.

The BS to which the redundant RRC connection is configured with the UE prepares the situation in which the link quality of the serving BS is improved again before the (previously received) T310 timer is terminated.

That is, in the case that the link quality of the serving BS is not recovered until the T310 timer is terminated (i.e., in the case of failing to receive the RRC Connection Release Request message from the UE until the T310 timer is terminated), the BS to which the redundant RRC connection is configured regards the RRC connection between the UE and the serving BS as being released.

The effect in an aspect of latency of the RLF avoiding method proposed in the present disclosure will be described through Table 3 and Table 4 below.

That is, the comparison between the RLF avoiding method proposed in the present disclosure and the conventional RLF avoiding method (defined in the LTE/LTE-A system) is as shown in Table 3 and Table 4 below.

For the comparison, among 50 ms, 100 ms, 200 ms, 500 ms, 1000 ms and 2000 ms values, the minimum value, 50 ms (maximum 2000 ms) is considered for the T310 timer value, and the Metric defined for C-plane according to TS 25.921 is used.

Particularly, it is assumed that an RRC Message Transfer Delay is 1 ms, and the Message Processing Delay by UE/eNB is 4 ms, and the X2 Message Transfer Delay between BSs is 5 ms.

In addition, in relation to the resource allocation for an RRC message transmission, it is assumed that the Message Transfer Delay such as the Scheduling Request (SR), the UL Grant for Buffer Status Report (BSR), the BSR, the UL Grant for Data, and the like is 1 ms, the Processing Delay is 3 ms, and the average time waited for sending the first SR is 0.5 ms (total 16.5 ms).

Table 3 represents a table in which the RLF recovering method shown in FIG. 14 and the conventional RLF recovering method are compared.

TABLE 3

| | Message | Delay (ms) | Message | Delay (ms) |
|---|---|---|---|---|
| 1 | T310 Timer | 50 | | |
| 2 | 4-Step UL Resource Allocation | 16.5 | 4-Step UL Resource Allocation | 16.5 |
| 3 | RRC Connection Re-establishment Request | 1 + 4 (5) | RRC Connection Request | 1 + 4 (5) |
| 4 | RRC Connection Re-establishment | 1 + 4 (5) | RRC Connection Setup Notification | 5 + 4 (9) |
| 5 | RRC Connection Re-establishment Complete | 1 + 4 (5) | RRC Connection Setup Confirmation | 5 + 4 (9) |
| 6 | UE Information Request | 1 + 4 (5) | RRC Connection Setup | 1 + 4 (5) |
| 7 | UE Information Response | 1 + 4 (5) | RRC Connection Setup Complete | 1 + 4 (5) |
| 8 | RLF Indication | 5 + 4 (9) | RRC Connection Release Request | 1 + 4 (5) |
| 9 | | | RRC Connection Release Complete (Optional) | 1 + 4 (5) |
| Total | | 100.5 ms | | 54.5 ms (59.5 ms) |

Table 4 represents a table in which the RLF recovering method shown in FIG. 15 and the conventional RLF recovering method are compared.

TABLE 4

| | Message | Delay (ms) | Message | Delay (ms) |
|---|---|---|---|---|
| 1 | T310 Timer | 50 | | |
| 2 | 4-Step UL Resource Allocation | 16.5 | 4-Step UL Resource Allocation | 16.5 |
| 3 | RRC Connection Re-establishment Request | 1 + 4 (5) | RRC Connection Request | 1 + 4 (5) |
| 4 | RRC Connection Re-establishment | 1 + 4 (5) | RRC Connection Setup Notification | 5 + 4 (9) |
| 5 | RRC Connection Re-establishment Complete | 1 + 4 (5) | RRC Connection Setup Confirmation | 5 + 4 (9) |
| 6 | UE Information Request | 1 + 4 (5) | RRC Connection Setup | 1 + 4 (5) |
| 7 | UE Information Response | 1 + 4 (5) | RRC Connection Setup Complete | 1 + 4 (5) |
| 8 | RLF Indication | 5 + 4 (9) | | |
| Total | | 100.5 ms | | 49.5 ms (59.5 ms) |

As represented by Table 3 and Table 4 above, in case of the RLF avoidance, since a UE configures the redundant RRC connection with a neighboring BS in preparation for the occurrence of a potential RLF before the T310 timer is terminated after the UE detects the PHY layer problem, the state in which a UE does not establish the RRC connection is decreased.

In addition, after the RLF occurs, a UE reports this to the BS that performs the RRC Connection Re-establishment, and makes the corresponding BS not perform the procedure of transmitting the RLF indication to the BS in which the RLF occurs.

In the embodiments of the present disclosure, N310 consecutive "out-of-sync" reception described in the RLF recovering method in the LTE(-A) system is considered as the Trigger Point of configuring the redundant RRC connection to the neighboring BS, but not limited thereto.

That is, the redundant RRC connection configuration (or alternative link activation) to the neighboring BS may be triggered by a single "out-of-sync" reception only, without waiting for the N310 consecutive "out-of-sync" reception.

In addition, according to the RLF avoiding method proposed in the present disclosure, since a UE or a serving BS instructs to avoid the RLF in preparation for a potential RLF occurrence, a serving BS is not required to receive the report of the RLF that is reported to the RRC connection reconfiguration target BS by the UE, as in the conventional RLF recovering method.

Figure 16:
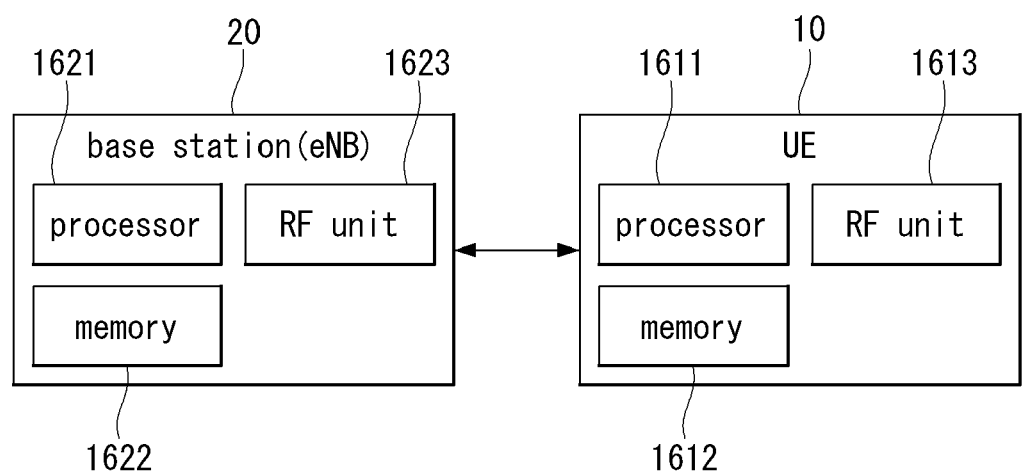
FIG. 16 is a block diagram illustrating a wireless device in which the methods proposed in the present disclosure may be implemented.

FIG. 16 is a block diagram illustrating a wireless device in which the methods proposed in the present disclosure may be implemented.

Here, the wireless device may be a network entity, a BS, a UE, and the like, and the BS includes both a macro BS and a small BS.

As shown in FIG. 16, the UE 10 and the BS 20 include a processors 1611 and 1621, memories 1612 and 1622, and RF units (transmitting/receiving units, communication units 1613 and 1623).

The BS and the UE may further include input units and output units.

The RF units 1613 and 1623, the processors 1611 and 1621, the input units and output units, and the memories 1612 and 1622 are operatively connected with each other in order to perform the methods as proposed in the present disclosure.

The RF units 1613 and 1623 receive the information created from a PHY (Physical Layer) protocol, transfer the received information through RF (Radio Frequency) spectrums and conduct filtering and amplification, then transmit the results through antennas. Further, the communication units transfer RF (Radio Frequency) signals received through the antennas to bands processable by the PHY protocol and perform filtering.

However, the communication units may also include the functions of switches to switch transmitting and receiving functions.

The processors 1611 and 1621 implement functions, procedures, and/or methods as proposed herein. The layers of radio interface protocols may be implemented by the processors.

The processors may be represented as control parts, controllers, control units, or computers.

The memories 1612 and 1622 are connected with the processors to store protocols or parameters for performing the method proposed in the present disclosure.

The processor 1611 and 1621 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The communication unit may include a base-band circuit for processing a radio signal. When the embodiment of the present invention is implemented in software, the aforementioned methods can be implemented with a module (i.e., process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

The elements and the method described in the embodiments are not limitedly applied to the method proposed in the present disclosure, but the whole or a part of each of the embodiments may be selectively constructed so as to form various modifications.

Meanwhile, the method as proposed herein may be implemented as processor-readable codes in a recording medium that may be read by a processor provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Further, the recording media readable by the processor may be distributed to computer systems connected with each other via a network, and processor readable codes may be stored and executed in a distributing manner.

It will be apparent to those skilled in the art that various substitutions, modifications and variations can be made in the present invention described so far, without departing from the spirit or scope of the inventions by those skilled in the art, and therefore, the present invention is not limited to the described embodiments and the accompanying drawings.

The method for performing the operation related to the radio link failure in a wireless communication system of the present invention has been described mainly with the example applied to 3GPP LTE/LTE-A system, but may also be applied to various wireless communication systems except the 3GPP LTE/LTE-A system.

What is claimed is:

1. A method for an operation related to a Radio Link Failure (RLF) in a wireless communication system performed by a user equipment (UE), comprising:
   monitoring a radio link state of a serving base station (BS);
   detecting a physical layer problem;
   transmitting a specific random access preamble related to the RLF to one or more neighboring BSs through a specific Physical Random Access Channel (PRACH) resource;
   receiving a random access response from the one or more neighboring BSs;
   determining a neighboring BS to which an additional RRC connection is to be configured based on the received random access response; and
   configuring an RRC connection with the determined neighboring BS,
   wherein the specific PRACH resource is a common PRACH resource that is separately configured to transmit the specific random access preamble.

2. The method of claim 1, further comprising driving a first timer related to the Radio Link Failure,
   wherein the specific random access preamble is transmitted in a predetermined section, and
   wherein the predetermined section corresponds to a time from a driving time of the first timer to the time when the first timer is terminated.

3. The method of claim 1, wherein the specific random access preamble is a preamble used for notifying that an additional RRC connection configuration is required in preparation for the Radio Link Failure.

4. The method of claim 1, wherein information related to the specific random access preamble and/or information related to the specific PRACH resource are/is included in system information.

5. The method of claim 2, further comprising checking whether the physical layer problem is solved until the first timer is terminated.

6. The method of claim 5, as a result of the checking, when the physical layer problem is solved, further comprising transmitting an RRC connection release request message for requesting to release the RRC connection configured to the determined neighboring BS.

7. The method of claim 1, wherein the random access response includes at least one of a cell ID of the neighboring BS, Load Status information representing a load state of the neighboring BS or identification information of the resource in which the specific random access preamble is detected.

8. The method of claim 1, wherein detecting the physical layer problem further includes checking whether consecutive out-of-sync. Indications are received as many as a preconfigured number in the physical layer.

9. The method of claim 5, wherein checking whether the physical layer problem is solved further includes checking whether consecutive out-of-sync. Indications are received as many as a preconfigured number in the physical layer.

10. The method of claim 1, wherein the serving BS and the one or more neighboring BSs use an identical frequency band.

11. The method of claim 1, wherein configuring the RRC connection with the determined neighboring BS includes:
    transmitting an RRC connection request message to the determined neighboring BS;
    receiving an RRC connection setup message from the determined neighboring BS; and
    transmitting an RRC connection setup complete message to the determined neighboring BS.

12. The method of claim 11, wherein the RRC connection request message includes at least one of cause information representing that the RRC connection request is intended to avoid a potential RLF, a cell ID of the serving BS and information related to the first timer.

13. The method of claim 6, wherein the RRC connection release request message includes cause information representing that the request of RRC connection release is owing to a recovery of the potential RLF.

14. A user equipment (UE) for performing an operation related to a Radio Link Failure (RLF) in a wireless communication system, comprising:
    a radio frequency (RF) unit for transmitting and receiving a radio signal; and
    a processor functionally connected to the RF unit,
    wherein the processor is configured to perform:
    monitoring a radio link state of a serving base station (BS);
    detecting a physical layer problem;
    transmitting a specific random access preamble related to the RLF to one or more neighboring BSs through a specific Physical Random Access Channel (PRACH) resource;

receiving a random access response from the one or more neighboring BSs;

determining a neighboring BS to which an additional RRC connection is to be configured based on the received random access response; and configuring an RRC connection with the determined neighboring BS, wherein the specific PRACH resource is a common PRACH resource that is separately configured to transmit the specific random access preamble.

* * * * *